(12) United States Patent
Hajduk et al.

(10) Patent No.: US 12,329,053 B2
(45) Date of Patent: Jun. 17, 2025

(54) NONTOXIC COATING CONCENTRATES FOR AGRICULTURAL USES

(71) Applicant: CROP ENHANCEMENT, INC., San Jose, CA (US)

(72) Inventors: Damian Hajduk, San Jose, CA (US); Anne Feng Xie, San Jose, CA (US); Brian Lin, Fremont, CA (US); Yeon S. Choi, San Jose, CA (US); Matheus Geraldo Pires de Mello Ribeiro, Brasilia-DF (BR)

(73) Assignee: Crop Enhancement, Inc., San Jose, CA (US)

( * ) Notice: Subject to any disclaimer, the term of this patent is extended or adjusted under 35 U.S.C. 154(b) by 947 days.

(21) Appl. No.: 17/146,603

(22) Filed: Jan. 12, 2021

(65) Prior Publication Data

US 2021/0212250 A1    Jul. 15, 2021

Related U.S. Application Data

(63) Continuation-in-part of application No. 16/696,029, filed on Nov. 26, 2019, now Pat. No. 12,127,556,
(Continued)

(51) Int. Cl.
*A01N 25/24*    (2006.01)
*A01C 1/06*    (2006.01)
(Continued)

(52) U.S. Cl.
CPC .............. *A01C 1/06* (2013.01); *A01N 25/24* (2013.01); *A01N 25/32* (2013.01)

(58) Field of Classification Search
CPC .............................. A01N 25/04; A01N 25/12
See application file for complete search history.

(56) References Cited

U.S. PATENT DOCUMENTS

| 1,689,008 A | 10/1928 | Arthur |
| H750 H | 3/1990 | Ogawa et al. |

(Continued)

FOREIGN PATENT DOCUMENTS

| AU | 2010359757 B2 | 11/2015 |
| CN | 1473473 A | 2/2004 |

(Continued)

OTHER PUBLICATIONS

English translation of publication JP2004187549A dated Jul. 8, 2004.
(Continued)

*Primary Examiner* — Johann R Richter
*Assistant Examiner* — Danielle Johnson
(74) *Attorney, Agent, or Firm* — Elmore Patent Law Group, P.C.; Mahreen Chaudhry Hoda; Carolyn S. Elmore

(57) ABSTRACT

The invention encompasses a nontoxic agricultural formulation of a concentrated liquid suspension comprising a drying oil and suspended particulate materials, and also encompasses an aqueous formulation comprising the concentrated liquid suspension and an agricultural treatment agent. The invention additionally encompasses methods of treating an agricultural target.

22 Claims, 5 Drawing Sheets

Related U.S. Application Data which is a continuation of application No. 15/641,897, filed on Jul. 5, 2017, now Pat. No. 10,492,356.

(60) Provisional application No. 62/961,055, filed on Jan. 14, 2020, provisional application No. 62/404,343, filed on Oct. 5, 2016, provisional application No. 62/359,191, filed on Jul. 6, 2016.

(51) Int. Cl.
*A01N 25/12* (2006.01)
*A01N 25/32* (2006.01)

(56) References Cited

U.S. PATENT DOCUMENTS

| | | | |
|---|---|---|---|
| 5,112,400 | A | 5/1992 | Nae et al. |
| 5,676,994 | A | 10/1997 | Eskins et al. |
| 5,910,509 | A | 6/1999 | Broedel et al. |
| 6,039,781 | A | 3/2000 | Goertz et al. |
| 6,451,731 | B1 | 9/2002 | Agbaje et al. |
| 6,743,756 | B2 | 6/2004 | Harris, Jr. et al. |
| 7,129,271 | B2 | 10/2006 | Maupin et al. |
| 7,371,444 | B2 | 5/2008 | Kajikawa |
| 7,906,131 | B2 | 3/2011 | Brower |
| 9,161,532 | B2 | 10/2015 | Devisetty |
| 10,492,356 | B2 | 12/2019 | Flores et al. |
| 2003/0194454 | A1 | 10/2003 | Bessette et al. |
| 2004/0035162 | A1* | 2/2004 | Williams ............... C05D 9/00 71/28 |
| 2006/0154824 | A1 | 7/2006 | Yoshii et al. |
| 2007/0275258 | A1 | 11/2007 | Ohnishi et al. |
| 2008/0305093 | A1 | 12/2008 | Gutsche et al. |
| 2010/0028295 | A1 | 2/2010 | Taranta et al. |
| 2010/0331187 | A1 | 12/2010 | Williams et al. |
| 2011/0033436 | A1 | 2/2011 | Chen et al. |
| 2011/0166023 | A1 | 7/2011 | Nettleton-Hammond et al. |
| 2011/0274912 | A1 | 11/2011 | Nakao et al. |
| 2011/0275516 | A1 | 11/2011 | Wu et al. |
| 2012/0071320 | A1 | 3/2012 | Atkinson et al. |
| 2012/0208700 | A1 | 8/2012 | Hopkins et al. |
| 2014/0213619 | A1 | 7/2014 | Matsuzaki |
| 2015/0004102 | A1 | 1/2015 | Salman et al. |
| 2015/0020239 | A1 | 1/2015 | Von Maltzahn et al. |
| 2015/0045213 | A1 | 2/2015 | O'Sullivan et al. |
| 2015/0359230 | A1 | 8/2015 | Messina |
| 2016/0088835 | A1 | 3/2016 | Castelani |
| 2016/0100573 | A1 | 4/2016 | Policello et al. |
| 2016/0183538 | A1 | 6/2016 | Taghavi et al. |
| 2018/0020607 | A1 | 1/2018 | Flores et al. |
| 2020/0229341 | A1 | 7/2020 | Flores et al. |

FOREIGN PATENT DOCUMENTS

| | | | |
|---|---|---|---|
| CN | 1647653 | A | 8/2005 |
| CN | 101810202 | B | 12/2012 |
| CN | 102885043 | A | 1/2013 |
| CN | 103004804 | A | 4/2013 |
| CN | 103380772 | A | 11/2013 |
| CN | 103688926 | A | 4/2014 |
| CN | 103733924 | A | 4/2014 |
| CN | 104488892 | A | 4/2015 |
| CN | 105766921 | A | 7/2016 |
| CN | 103918686 | B | 9/2016 |
| CN | 106259369 | A | 1/2017 |
| CN | 109006811 | A | 12/2018 |
| CN | 109714964 | A | 5/2019 |
| CN | 110622961 | A | 12/2019 |
| EP | 0313317 | A2 | 4/1989 |
| JP | 01110605 | A | 4/1989 |
| JP | H0769769 | A | 3/1995 |
| WO | 0117346 | A1 | 3/2001 |
| WO | 0181476 | A1 | 11/2001 |
| WO | 2004112482 | A2 | 12/2004 |
| WO | 2005007758 | A2 | 1/2005 |
| WO | 2008031512 | A1 | 9/2007 |
| WO | 2012101660 | A1 | 8/2012 |
| WO | 2013171525 | A1 | 5/2013 |
| WO | 2016035090 | A1 | 3/2016 |
| WO | 2018009549 | A1 | 1/2018 |

OTHER PUBLICATIONS

"Biopesticides: Horticultural Oils", UF IFAS Gardening Solutions retrieved at: https://gardeningsolutions.ifas.ufl.edu/care/pests-and-diseases/pests/management/natural-pest-control-with-oils.html on Mar. 28, 2023, 2 pgs.

"Conventional Pesticide Registration", United States Environmental Protection Agency retrieved at: https://www.epa.gov/pesticide-registration/conventional-pesticide-registration on Apr. 12, 2023, 5 pgs.

"What are biopesticides", United States Environmental Protection Agency retrieved from: https://www.epa.gov/ingredients-used-pesticide-pro ucts/what-are-biopesticides on Mar. 28, 2023, 3 pgs.

"What is a Pesticide?", United States Environmental Protection Agency retrieved at: https://www.epa.gov/minimum-risk-pesticides/what-pesticide on Apr. 12, 2023, 3 pgs.

ATTAGEL® 50-Dispersions, Resins and Additives, North America. Retrieved from the Internet on Jun. 30, 2020. <<https://dispersions-resins-products.basf.us/products/attagel-50.>>.

Machine translations and claims translation for CN103733924 obtained from Google Patents and Morningside Translations.

Fu, F. et al., "Research on Chlorantraniliprole+ Lambda cyhalothrin 15% OF", Modern Agrochemicals, vol. 12 No.3, Jun. 30, 2013, 26-28.

Machine translation for CN1473473A obtained from Google Patents Translations.

CABB Media , "What Are Active Ingredients", retrieved online at https://cabb-chemicals.com/what-are-active-ingredients/.

* cited by examiner

NONTOXIC COATING CONCENTRATES FOR AGRICULTURAL USES

RELATED APPLICATIONS

This application claims the benefit of Provisional Application No. 62/961,055 filed Jan. 14, 2020. This application is also a continuation-in-part of U.S. application Ser. No. 16/696,029 filed Nov. 26, 2019, which is a continuation of U.S. application Ser. No. 15/641,897, filed Jul. 5, 2017 (now U.S. Pat. No. 10,492,356, issued on Dec. 3, 2019), which claims the benefit of U.S. Provisional Patent Application No. 62/359,191 filed Jul. 6, 2016, and U.S. Provisional Patent Application No. 62/404,343, filed Oct. 5, 2016. The entire contents of each of the above applications are incorporated by reference herein.

FIELD OF THE APPLICATION

This application relates to coating formulations for agricultural uses.

BACKGROUND

Agricultural chemicals used as fertilizers, pesticides, herbicides, and the like, are prone to erosion and leaching from treated soils and plants. For example, fertilizers that are applied to fields can suffer run-off or loss caused by rapid watering, rain, or other water exposures. As another example, chemicals that are applied to foliar surfaces are prone to loss due to erosion from treated plants. As yet another example, pre-emergent agents (i.e., those agents that are applied to the soil before the germination of plants or weeds) need to stay where they are applied for a period of time while the plants and/or weeds are germinating. Dissipation of a pre-emergent agent by microbial activity, photodegradation, chemical degradation, run-off by water exposure, and the like, is undesirable during the germination period, and it is advantageous that the agent be retained in the top one or two inches of soil during this period. These problems are especially important for optimizing the properties of agents that need to act over a prolonged period of time to obtain their desired effect, as opposed to those agents that exert their effects immediately, like, for example, a pesticide that kills on contact. Without improved retention properties, agricultural chemicals can be washed off with rain or can be wiped off too easily.

As an example, protection of pre-harvest fruits/nuts/vegetables is of paramount importance. Growing fruits or vegetables on the trees and vines and bushes are prone to pest infestation and their tender skins are prone to sunburns reducing the overall yield of these products. In new farming methods, there is a push to reduce or eliminate the amount of synthetic pesticides that are used, particularly on fruits or vegetables with edible skins. To help overcome pest problems, these fruits or vegetables are often sprayed with particles capable of forming a barrier layer to prevent pest infestation and to prevent sunburns. In some other fruits such as cherries and tomatoes, even accumulation of water at the stems of the fruit leads to imbibition of water leading to osmotic imbalance inside the fruit resulting in unsightly cracking of fruit skin. To prevent this, there is a need for a breathable, benign and rainfast barrier coatings. There remains a need in the art for nontoxic alternatives to the use of pesticides to protect agricultural materials from insects, fungi, animals, drought conditions, air pollution damage, and solar damage. Furthermore, a need exists to improve herbicide performance by (1) enhanced retention of the active ingredients in the topsoil, (2) prevention of active ingredient leaching (i.e., sustained release) and (3) protection of the herbicides against photodegradation. There is a particular need for pre-harvest fruit/nut/vegetable protection because of the high value of these crops and the demand for organic produce.

For successful pest management, conventional pesticides can be selected based on a variety of factors, including, for example, pest species and crop-specific management programs. Due to the biological and behavioral complexity of pest species, it is desirable to provide pre-harvest protection that has a range of properties, so that the performance parameters can be adjusted to manage a particular pest on a particular crop. For example, for coatings applied to plant surfaces, it would be advantageous to optimize the durability and flexibility of a coating for use with a particular plant surface. Moreover, while coatings exist that can be applied to plant surfaces, there remains a need in the art, for example, to optimize these coatings for coverage and drying time, so that they are targeted to the feeding behavior, reproductive activities, and lifecycle of specific pests. For a given pest species, an optimized coating regimen would be tailored to the behavior of the pest species and its interaction with its hosts. A range of pest-inhibiting mechanisms may therefore be desirable for a coating, with options for customization. For example, a coating may cloak the agricultural surface and render it unrecognizable to a particular pest. As another example, the coating may alter the natural behavior of pests on their hosts by interfering with their feeding, reproduction, or motility. As yet another example, if a pest can be induced to ingest the coating, the ingested coating material may interfere with its metabolism or digestion, thus impairing its natural developmental or reproductive processes. In view of the variety of pests, pest behaviors to constrain, and hosts that harbor the pests, it is desirable to provide coating formulations having a variety of properties that can be selected with the specific pest-host interaction in mind.

In addition, it is desirable that coating formulations be combinable with other treatment modalities either within a single application of the formulation or through combined treatment protocols with multiple applications of the same formulation or of different formulations. A new generation of herbicides and other such agricultural treatment agents are biologically derived. For example, there are biological control agents that require delivery to agricultural targets, where retention and/or controlled release of those agents in proximity to the agricultural target is desired. As used herein, the term "agricultural target" is selected from the group consisting of a leaf, a fruit, a vegetable, a seed or seed case, a stem, a post-harvest agricultural product, and a soil, agricultural growth medium, or other agricultural substrates as would be understood by those of ordinary skill in the art. Desirably, a delivery formulation providing improved retention properties would be suitable for use with biological control agents.

Herbicides, insecticides, fungicides, plant growth regulators, insect pheromones, nutrients and other agricultural treatment agents are also advantageously used in spraying fruits or vegetables and plants directly. For example, cocoa pods can be afflicted by "black pod" disease, treated by spraying the pods with both fungicides and insecticides. Black pod is a plant disease caused by *Phytophthora* type oomycetes such as *Phytophthora infestans*, the pathogen that caused the Irish potato famine. Enhanced retention of the treatment agents on the target (e.g., the cocoa pod) can improve their efficacy and improve the efficiency of treatment protocols. A naturally derived coating for the cocoa pods could also create a physical barrier (i.e., a barrier coating composition, formed for example as a film) to deter pests, and could reduce or eliminate the need for additional treatment agents.

Agricultural treatment agents (pesticides, fertilizers, plant growth regulators, and the like) are costly and can cause environmental damage if misused. There is a need for materials and methods to improve the efficiency and costs associated with the use of agricultural treatment agents, or to reduce or eliminate the need for agricultural treatment agents.

SUMMARY

Disclosed herein, in embodiments, is a nontoxic agricultural formulation of a concentrated liquid suspension comprising an organic phase and suspended particulate materials. In embodiments, the formulation forms a cured coating on an agricultural target. In embodiments, the curing is water-resistant, resistant to friction, or rainfast. In embodiments, the cured coating retains the suspended particulate matters on the agricultural target when subject to an adverse condition, where the adverse condition can be a condition such as rainfall, friction, wind, water exposure, and secondary agricultural treatment. In embodiments, the formulation is stable against phase separation. In embodiments, the formulation comprises food grade ingredients, or comprises organically produced ingredients, or comprises ingredients generally recognized as safe. In embodiments, the formulation consists essentially of organically produced ingredients, or consists essentially of ingredients generally recognized as safe. In embodiments, the concentrated liquid suspension contains only non-aqueous liquids. The organic phase of the formulation can be about 40-99% by weight of the formulation. The organic phase can comprise a drying oil, and the drying oil can be selected from the group consisting of linseed oil, raw linseed oil, boiled linseed oil, castor oil, castor oil glycidyl ether, tung oil, poppy seed oil, grapeseed oil, safflower oil, linoleic acid, linolenic acid, oleic acid, salicornia oil, sunflower oil, evening primrose oil, perilla oil, soybean oil, corn/maize oil, canola/rapeseed oil, and walnut oil. In embodiments, the drying oil comprises α-linolenic acid, linoleic acid, or a combination thereof.

In embodiments, the drying oil is a naturally derived mixture of one or more acylglycerols capable of undergoing a spontaneous transformation from a liquid to a solid state upon exposure to oxygen; in embodiments, the drying oil comprises one or more different acylglycerols. In embodiments, the spontaneous transformation is characterized by the development of crosslinks between double bonds on the one or more acylglycerols; in embodiments, the spontaneous transformation results in the formation of a polymer network.

In embodiments, the organic phase of the formulation comprises a first oil and a second oil mixed together to form a blend, and wherein at least one oil of the first oil and the second oil is the drying oil, and this formulation can have one or more physical properties that are different than the physical properties of the first oil and the second oil, which physical properties can be selected from the group consisting of glass transition temperature of the cured film, solubility of small molecules in the cured film, permeability of the cured film to small molecules, film stiffness, film tack, film drying time, and durability. In embodiments, this formulation can have improved pest control properties when compared to pest control properties of a control formulation whose organic phase comprises a single drying oil, and the pest control properties can be selected from the group consisting of diminished pest survival time, diminished pest fecundity, pest feeding deterrence, pest reproductive deterrence, and reduced plant damage. In embodiments, the organic phase of the formulation comprises α-linolenic acid or linoleic acid. In embodiments, the first oil and the second oil are both drying oils, and the first oil and the second oil can have different degrees of unsaturation. In embodiments, the blend comprises at least one additional oil; the at least one additional oil can be a drying oil and the at least one oil can be selected from the group consisting of linseed oil, raw linseed oil, boiled linseed oil, castor oil, castor oil glycidyl ether, tung oil, poppy seed oil, grapeseed oil, safflower oil, linoleic acid, linolenic acid, oleic acid, salicornia oil, sunflower oil, evening primrose oil, perilla oil, soybean oil, corn/maize oil, canola/rapeseed oil, and walnut oil. In embodiments, the blend further comprises a diluent, and the diluent can be selected from the group consisting of a mineral oil, a petroleum distillate, an alcohol, a terpene, and a glycol.

In embodiments, the suspended particulates are about 0.5-50% of the formulation. The suspended particulates can be durably suspended in the organic phase or easily resuspended in the organic phase. In embodiments, the suspended particulates are selected from the group consisting of clay minerals and organically modified minerals. The clay minerals can be selected from the group consisting of kaolin clays, smectite clays, illite clays, chlorite clays, sepiolite, and attapulgite. In embodiments, the clay mineral can be a bentonite clay. In embodiments, the organically modified mineral is a clay mineral, and the organically modified mineral can be modified with an organic modifier selected from the group consisting of a fatty acid, fatty amine, fatty amide, fatty ester, fatty amine quat, quaternary amine surfactant, cetyltrimethylammonium bromide, fatty alcohol, decyl alcohol, dodecyl alcohol, linseed oil, alkenyl succinic anhydride, styrene maleic anhydride copolymer, colophony, rosin, chitosan, and a castor oil derivative. In embodiments, the formulation further comprises a pesticide, herbicide, beneficial bacterium, beneficial fungus, plant growth regulator, pheromone, sunscreen, biopesticide, or nutrient. In embodiments, the formulation further comprises a botanical extract or a plant oil. In embodiments, the formulation further comprises an additional particulate material. In embodiments, the additional particulate matter can be selected from the group consisting of talc, calcium carbonate, gypsum, magnesium silicate, calcium silicate, corn starch, cellulose fibers, *psyllium* fibers, ethylene bis stearamide, microcrystalline cellulose, stearic acid, oleic acid, wax, carnauba wax, and beeswax, or it can be kaolin or titanium dioxide. In embodiments, the formulation further comprises a surfactant. The surfactant can be selected from the group consisting of anionic, cationic, nonionic, biodegradable, food grade and organic surfactants. In embodiments, the formulation further comprises an adjuvant selected from the group consisting of cellulosics, polylactic acid, polyglycolic acid, and polylactic-glycolic acid. In embodiments, the formulation further comprises a salt or a curing additive.

Further disclosed, in embodiments, is an aqueous formulation comprising the concentrated liquid suspension as described above and an agricultural treatment agent. Also disclosed, in embodiments, is a coated agricultural treatment agent comprising an agricultural treatment agent and the concentrated liquid suspension as described above, wherein the concentrated liquid suspension is applied to the agricultural treatment agent as a coating. In addition, disclosed herein are embodiments of a plant product having a surface treated with the formulation as described above.

Disclosed herein, in embodiments, are methods of treating an agricultural target, comprising providing an agricultural formulation of a concentrated liquid suspension comprising an organic phase and suspended particulates, and applying the agricultural formulation onto the agricultural target, thereby treating the agricultural target. In embodiments, the method protects the agricultural target from a pest or from environmental damage. In embodiments, the treatment comprises non-lethally altering the behavior of the pest. In embodiments, the agricultural target is a soil surface or an agricultural growth medium. In embodiments, the soil surface is treated to produce a beneficial effect selected from the group consisting of erosion control, nutrient retention, agricultural treatment agent retention, dust control, delivery of beneficial microbes, delivery of biopesticides, or augmentation of beneficial microbial growth. In embodiments, the agricultural target is a plant surface. The plant surface can be selected from the group consisting of leaves, fruits, seeds, berries, nuts, grains, stems, and roots. The plant surface can be a harvested product surface for a harvested product. In embodiments, the agricultural target is an agricultural growth medium. In embodiments, the agricultural formulation is applied to the agricultural target at a dosing rate of about 1 to about 200 lbs. of formulation per acre of crop. In embodiments, the agricultural formulation is diluted with a solvent prior to the step of applying the formulation.

Further disclosed herein are methods for reducing spore-based transmission of a fungal plant disease by treating a plant surface with the formulations as described above, wherein the fungal plant disease is caused by a disease-causing fungus spore, and wherein contact with the formulation interferes with capacity of a disease-causing fungus spore to become airborne, thereby reducing spore-based transmission of the fungal plant disease. Also disclosed herein are methods of reducing spore-based transmission of a fungal plant disease by applying the formulations as described above to a plant surface, wherein the fungal plant disease is caused by a disease-producing fungal spore, and wherein contact with the formulation interferes with the ability of the disease-producing fungal spore to germinate on the plant surface, thereby reducing spore-based transmission of the fungal plant disease. Also disclosed herein are methods of treating a plant infection by applying the formulations as described above to a plant surface in need thereof. Such methods of treating comprise preventing the infection.

DETAILED DESCRIPTION

Figure 1:
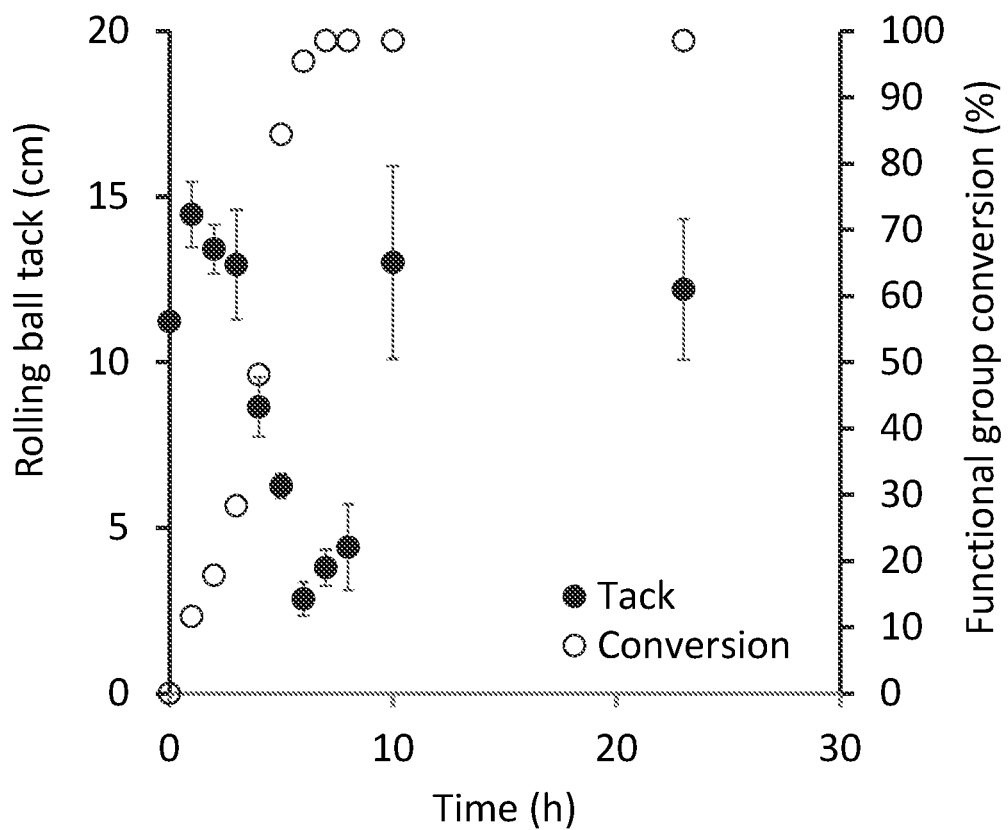
FIG. 1 is a graph showing rolling ball distance and alkene conversion as functions of time.

The present disclosure relates to nontoxic agricultural formulations in the form of a concentrated liquid suspension, where the formulation can form a cured coating on an agricultural target. The concentrated liquid suspensions of nontoxic agricultural formulations can be diluted in water to make solutions of the agricultural formulation for application by spraying, brushing, dipping, broadcasting, or irrigating. The agricultural formulations can be applied to a variety of agricultural substrates or targets, such as agricultural surfaces, including plant surfaces (leaves, fruits, seeds, berries, nuts, grains, stems, roots, etc.), soils or agricultural growth media, and harvested plant products such as fruits, vegetables, seeds, grains, stems, roots, and the like. As used herein, a plant surface is a surface of plant whether pre- or post-harvest; a plant product is a post-harvest agricultural product. Agricultural formulations and methods for treating agricultural substrates and targets are disclosed herein.

A. Agricultural Formulations

In embodiments, the nontoxic agricultural formulations comprise a plant oil that contains fatty acid or fatty ester functional groups that have at least one degree of unsaturation, such as monounsaturated and polyunsaturated fats. In embodiments, the plant oil contains unsaturated fatty groups such as alpha-linolenic acid, linoleic acid, and oleic acid, where these fatty groups can be in the form of a fatty acid, fatty acid salt, fatty ester, triglyceride, diglyceride, monoglyceride, or fatty amide. In embodiments, the nontoxic agricultural formulations comprise a plant oil that contains fatty acids, in the form of free fatty acids or esters, salts, or amides of fatty acids, that contain acyl chains with sufficient unsaturation to yield at least two carbon-carbon double bonds per molecule. In embodiments, the fatty acids comprise unsaturated fatty acids such as alpha-linolenic acid, linoleic acid, and oleic acid.

In embodiments, the plant oil is a drying oil. As used herein, the term "drying oil" can refer to a self-crosslinking oil consisting of glycerol triesters of fatty acids, or to the plant oils described herein. Alternatively, as used herein, the term "drying oil" can refer to naturally derived mixtures of glycerol esters of fatty acids (acylglycerols) in which the oil spontaneously transforms from a liquid to a solid state upon exposure to oxygen. This transformation occurs through the development of crosslinks between double bonds on different acylglycerols, resulting in the formation of a polymer network. Drying oils are therefore characterized by a high concentration of molecules with at least two degrees of unsaturation, such as polyunsaturated acylglycerols. As an example, drying oils can be characterized by high levels of polyunsaturated fatty acids, especially alpha-linolenic acid. Examples of drying oils include linseed oil (i.e., flax seed oil, including boiled linseed oil (BLO) and raw linseed oil (RLO)), tung oil, poppy seed oil, canola/rapeseed oil, sunflower oil, safflower oil, soybean oil, fish oil, hemp oil, corn/maize oil, dehydrated castor oil, tall oil, perilla oil and walnut oil. As crosslinks develop between double bonds of neighboring chains in the presence of atmospheric oxygen, a polymer network is formed, and the oil cures or "dries." The drying oils by themselves form tough hydrophobic films, so they can be used to coat surfaces or particles to repel moisture. The drying oils, as disclosed herein, can also suspend particulate materials, either so that the particulate materials do not separate from the drying oil ("durable" suspension), or so that the particulate materials are easily resuspended in the drying oil if they initially separate out. In certain aspects, the acylglycerol comprises a linolein. As an example, linseed (or flaxseed) oil is a drying oil that is derived from the dried, ripened seeds of the flax plant. It comprises three key fatty acids, linoleic acid, linolenic acid, and oleic acid, predominately formed as glycerides (especially triglycerides). Linseed oil contains significant amounts of the triglyceride linolein, formed as an acylglycerol with three molecules of linoleic acid. In addition, small amounts of palmitic acid and arachidic acid are found in linseed oil as free fatty acids.

In embodiments, the oil phase of the concentrated liquid suspension comprises drying oils, waxes, cellulosics, linseed oil, boiled linseed oil, castor oil, castor oil glycidyl ether, magnesium stearate, linseed oil, tung oil, poppy seed oil, grapeseed oil, safflower oil, linoleic acid, linolenic acid, oleic acid, salicornia oil, sunflower oil, corn oil, hemp oil, wheat germ oil, cottonseed oil, soybean oil, sesame oil, canola oil, evening primrose oil, perilla oil, walnut oil, and the like. In embodiments, the oil phase of the concentrated liquid suspension contains diluents such as mineral oil, a petroleum distillate, an alcohol, a terpene, or a glycol such as glycerin or propylene glycol to improve fluid handling properties, or to improve the flexibility of the dried film. Preferably the oil phase contains α-linolenic acid, linoleic acid, or a combination thereof.

In embodiments, two or more drying oils having different degrees of unsaturation can be blended together to form the oil phase, resulting in films that express different physical properties than would be found with any single one of the component oils. As an example, properties such as duration of wetness, drying profile, tackiness, or film stiffness can be tuned by combining two or more drying oils. Other properties such as glass transition temperature of the cured film, solubility of small molecules in the cured film, permeability of the cured film to small molecules, and the like, can be tuned by combining two or more drying oils and allowing the blend to cure and form a film. Without being bound by theory, it is understood that these properties in the oil blends can be attributable to the chemistry of the unsaturated oils when exposed to atmospheric conditions: when exposed to light and/or oxygen, unsaturated bonds in oils can become reactive and subsequently form intermolecular bonds or crosslinks. This crosslinking behavior involving the oils in the oil blend can affect physical properties of the film that the blend forms as it dries or cures on a plant surface. For example, oils that possess a lower concentration of unsaturated bonds typically exhibit a weaker ability to form films; by contrast, oils with a higher concentration of unsaturated bonds exhibits a higher affinity to form films. Accordingly, by employing a formula chassis, a variety of drying oils having different unsaturation profiles can be measured and mixed, resulting in formulations having a range of properties desirable for pest controls. Selecting the oils for a given blend and varying the amount of the component oils within the blend affords a mechanism for tuning, adjusting, and customizing the physical properties of the blend when it is used as an oil phase for a concentrated liquid suspension. In embodiments, the unsaturated oils used alone to form the oil phase of the concentrated liquid suspension can also be blended together to form the oil phase. Two or more unsaturated oils can be used, in proportions that exploit the properties of each. For example, various drying oils can be used, such as linseed oil, boiled linseed oil, castor oil, castor oil glycidyl ether, tung oil, poppy seed oil, grapeseed oil, safflower oil, linoleic acid, linolenic acid, oleic acid, salicornia oil, sunflower oil, corn oil, hemp oil, wheat germ oil, cottonseed oil, soybean oil, sesame oil, canola oil, evening primrose oil, perilla oil, walnut oil, and the like. Preferably the oil phase contains α-linolenic acid, linoleic acid, or a combination thereof. In certain aspects, the first oil is linseed oil (including, for example, boiled linseed oil) and the second oil is selected from the group consisting of tung oil, poppy seed oil, grapeseed oil, safflower oil, linoleic acid, linolenic acid, oleic acid, salicornia oil, sunflower oil, corn oil, hemp oil, wheat germ oil, cottonseed oil, soybean oil, sesame oil, canola oil, evening primrose oil, perilla oil, walnut oil. In further aspects, the first oil is linseed oil and the second oil is selected from the group consisting of tung oil, poppy seed oil, grapeseed oil, safflower oil, salicornia oil, evening primrose oil, perilla oil, walnut oil, soybean oil, and canola oil. In yet further aspects, the first oil is linseed oil and the second oil is selected from the group consisting of tung oil, poppy seed oil, grapeseed oil, safflower oil, salicornia oil, evening primrose oil, perilla oil, walnut oil, and soybean oil.

In embodiments, non-drying oils can be used in addition to the drying oils as described herein. In embodiments, the oil blend comprises at least one drying oil and one additional oil, wherein the additional oil is miscible with the drying oil. The additional oil can be a monoacylglyceride, a diacylglyceride, a triacylglyceride, a naturally occurring mixture of such components such as a plant oil, or an artificially prepared mixture of these components.

It has been unexpectedly discovered that an oil phase formed from oil blends has certain advantageous properties as compared to an oil phase formed from a single blend. In embodiments, such properties can include improved drying properties, and improved impact on pest control (e.g., decreased pest survival, decreased pest fecundity, pest feeding deterrence, pest reproductive deterrence, reduced plant damage, and the like), as discussed below in further detail.

The concentrated liquid suspension contains particulate material suspended in the oil phase described above. In embodiments, the particulate material can be a clay mineral. Clay minerals include, without limitation, the following types of clays: (a) kaolin clays (including the minerals kaolinite, dickite, halloysite, and nacrite (polymorphs of $Al_2Si_2O_5(OH)_4$); (b) smectite clays, including dioctahedral smectites such as such as nontronite and montmorillonite, and trioctahedral smectites such as saponite; (c) illite clays, which include the clay-micas; (d) chlorite clays, and (e) other clay types such as sepiolite and attapulgite. In an embodiment, the clay mineral can be a bentonite clay.

In embodiments, the particulate material can be an organically modified mineral such as an organoclay. For example, an organoclay can comprise a mineral such as a bentonite, kaolin, zeolite, attapulgite, or talc that is modified with an organic modifier such as a fatty acid, fatty amine, fatty amide, fatty ester, fatty amine quat, quaternary amine surfactant, cetyltrimethylammonium bromide, fatty alcohol, decyl alcohol, dodecyl alcohol, linseed oil, alkenyl succinic anhydride (ASA), styrene maleic anhydride (SMA) copolymer, colophony, rosin, chitosan, or a castor oil derivative such as THIXCIN®.

In embodiments, the particulate material can be talc, calcium carbonate, gypsum, magnesium silicate, calcium silicate, corn starch, cellulose fibers, *psyllium* fibers, ethylene bis stearamide, microcrystalline cellulose, stearic acid, paraffin wax, carnauba wax, or beeswax, with particulate materials used either individually or together as mixtures. In other embodiments, the particulate material can be a specialized particle that is chosen to form barriers, for example, against moisture or pest infestation. In embodiments, specialized particles can comprise planar high-aspect-ratio particles such as clays, mica, and the like, that have the ability to form a flat organized film when mixed with suitable binders. In certain embodiments, the particulate material of the formulation can be a non-clay mineral such as mica, talc, silica, titanium dioxide, gypsum, calcium carbonate, aluminum phosphate, and the like. In preferred embodiments, the particulate material of the formulation can be bentonite, exfoliated bentonite, organoclays, kaolin, gypsum, zeolite, fuller's earth, or diatomaceous earth.

In embodiments, clay for these applications can be exfoliated by use of the methods set forth in WO2013/123150 (PCT Application No. PCT/US13/2684 entitled "Processes for Clay Exfoliation and Uses Thereof"), the contents of which are incorporated herein by reference. The incorporation of particles in the barrier films provides additional benefits of reflecting or absorbing light and heat energy. Certain fruits and vegetables are subject to crop losses or economic damage due to exposure to environmental stresses like excessive sunlight, freezing or frost conditions, oxidative damage, microbial or fungal growth, osmotic swelling and cracking during wet conditions, heat stress, and desiccation during low humidity or windy conditions. The incorporation of particles in the barrier films of the disclosed formulations can reduce the damages caused by these stresses. These particles can be combined with additional high brightness pigments such as titanium dioxide ($TiO_2$) to provide a white or a reflective surface that lowers heat absorption from sunlight and thereby reducing sunburn-induced or heat-induced damage. $TiO_2$ can additionally enhance the ultraviolet (UV) light resistance of the agricultural target surface by absorbing or reflecting the majority of the UV radiation incident on the agricultural target surface. Other sunscreen materials such as conjugated organic compounds may also be included.

The agricultural formulations are provided in the form of a concentrated liquid suspension comprising an oil-based continuous phase and suspended particulates. The concentrated suspension is a liquid with a viscosity between about 10 cP and about 50,000 cP, as measured by a Brookfield LVDV-III+ Rheometer with spindle LV-3 or LV-4 at 30 rpm; alternatively, the concentrated suspension is a paste-like fluid with a viscosity between about 50,000 cP and 500,000 cP, as measured by the same instruments under the same conditions. In embodiments, the concentrated suspension is a liquid with a viscosity between about 50 cP and about 5000 cP. In embodiments, the concentrated suspension is stable against separation of the particulates from the oil based continuous phase (i.e., phase separation), such that the suspension resists sedimentation for at least 24 hours after it is mixed. In embodiments, the suspension resists sedimentation for at least 90 days after it is mixed. In embodiments, the concentrated suspension contains more oil-based liquid than suspended particulates on a mass basis. In embodiments, the mass ratio of particulates to oil-based liquid in the formulation is in the range of 1 to 100 parts of particulates per 100 parts of oil-based liquid. In embodiments, the concentrated liquid suspension is free of water.

In embodiments, the agricultural formulation comprises surfactants to improve dispersibility of the particulate minerals in the oil phase, to provide surface stabilization of the particulate minerals in oil, and/or to improve the wetting of the diluted formulation on an agricultural target. As would be understood in the art, particulate materials such as minerals can be hydrophilic in nature, so that they do not readily become suspended in an oil. In embodiments, therefore, the formulation contains a surfactant or dispersant that can act as wetting agents. In embodiments, the agricultural formulation can comprise additives such as an ethoxylated alcohol, a sorbitan fatty ester, an alkylpolyglycoside, an ethylene oxide/propylene oxide (EO/PO) copolymer, guar, xanthan, soy lecithin, or an ethoxylated sorbitan stearate. In other embodiments, a nonionic silicone polymeric surfactant such as Sylgard OFX-0309 (Dow) and Triton HW-1000 (Dow) can be employed as a wetting agent. As would be understood by practitioners of skill in the art, a variety of additives can act as wetting agents. In embodiments, various additives are also understood to facilitate the stable suspension of the particulate minerals in the oil phase, allowing a durable and stable concentrated liquid formulation.

In embodiments, the agricultural formulation comprises dispersants or suspending agents to improve dispersibility and dilutability of the formulation into water, to improve the stability of the diluted formulation, and/or to improve the wetting of the diluted formulation on an agricultural target. In embodiments, the concentrated liquid suspension contains a dispersant or suspending agent such as guar, xanthan, carboxymethylcellulose, carrageenan, alginate, gelatin, pectin, starch, hydroxypropylguar, hydroxypropylcellulose, hydroxypropylmethyl cellulose, hydroxypropylethyl cellulose, hydroxyethylcellulose, and ethylcellulose. In embodiments, the dispersant or suspending agent is added to the agricultural formulation at about 0.01% to about 5% on a weight basis. In embodiments, the dispersant or suspending agent is added to the agricultural formulation at about 0.1% to about 2% on a weight basis. In embodiments, the dispersant or suspending agent is added to the agricultural formulation at about 0.1% to about 1% on a weight basis.

In embodiments, the agricultural formulation comprises one or more stabilizing additives, which may be added in amounts ranging from 0.1 wt % to 30 wt %, depending on the additive. Without being bound by theory, it is understood that, because the formulation comprises domains of high-density material dispersed in a continuous domain of low-density material, gravitational forces can drive the high-density material to settle on the bottom of the container and form sediment. To counter this, stabilizing additives can be employed to increase the viscosity of the continuous phase, thereby reducing the sedimentation rate, but these render the formulation difficult for the users to pour. As an alternative, additives can be selected that cause the continuous phase to exhibit pseudoplastic behavior, i.e., where the viscosity decreases with increasing shear rate. A formulation containing such additives exhibits a reduced sedimentation rate but can still be poured easily, since the shear rate characteristic of sedimentation is considerably less than that of pouring, mixing, or other fluid transfer processes.

In embodiments, stabilizing additives can be selected that cause the continuous phase to form a fragile solid at low shear stresses that transforms into a liquid once a critical stress level is exceeded. The composition and concentration of such an additive is chosen such that the critical stress is slightly greater than the shear stress associated with sedimentation. A formulation containing such additives exhibits essentially no sedimentation, but flows freely once the fragile solid is disrupted by shaking, mixing, or other forms of gentle agitation. In embodiments, stabilizing additives producing this behavior comprise one or more macromolecules that contain weakly associating groups. Interaction among these weakly-associating groups leads to the formation of a network structure that extends throughout the formulation and is characterized by a yield stress. Desirably, applied shear stresses that exceed the yield stress disrupt these associations, resulting in the collapse of the network and the macroscopic flow of the formulation.

In embodiments, additives especially suitable for manifesting these properties include nonionic triblock copolymers, such as poloxamers, composed of a central hydrophobic chain (e.g., polyoxypropylene) between two hydrophilic chains (e.g., polyoxyethylene), for example, those provided by the PLURONIC® series of materials (BASF), and polyether amines, such as the polyether diamines in the JEFFAMINE® ED series (Huntsman). In other embodiments, useful stabilizing additives can include castor oil derivatives such as trihydroxystearin and related rheology modifiers (THIXCIN® and THIXATROL® (Elementis Specialties)), or RHEOCIN® or RHEOCIN T® (BYK Additives and Instruments). Additives for these purposes can be added at doses ranging from 0.01 to 1 wt %, preferably from 0.05 to 0.3 wt %. In embodiments, the stabilizing additive can be added to the agricultural formulation at an elevated temperature relative to that of the formulation while mixing with high intensity, for example at a temperature ranging from about 55 to about 65° C.

In embodiments, stabilizing additives can include modified urea, urea-modified polyamides, urea-modified polyurethanes, hydroxyl-terminated polybutadiene resins (KRASOL® (Cray Valley)), glycol ethers (e.g., the DOWANOL™ series (Dow Chemical)), polyamides, polyester amides, and the like. As examples, compounds such as the BYK® products: BYK 7411 ES, BYK 431, BYK 430 and BYK 425 (BYK Additives and Instruments) can be used. These additives can be incorporated in the system at a concentration ranging from about 0.1 to about 4 wt % and preferably from about 0.2 to about 2 wt %. In embodiments where glycol ethers are used (e.g., the DOWANOL™ series (Dow Chemical)), the selected glycol ethers will preferably have a high solubility in water. As an example, the Dowanol TPM can be used at a dose ranging from about 3 to about 5 wt % and preferably about 4 wt %. In other embodiments, stabilizing additives can include surfactants derivatized from fatty acids such as fatty acid polydiethanolamide: examples of these are cocamide diethanolamine, lauramide diethanolamine, soyamide diethanolamine and the like, representative versions of which can be found in the AMIDEX™CE, KD, LSM products from Lubrizol. In other embodiments, surfactants derived from fatty acids such as the polyglycerol esters of fatty acids can be used as stabilizing additives. These fatty-acid derived additives can be added at a dose ranging from about 1 to about 5 wt % and preferably about 3%.

In embodiments, the agricultural formulations comprise biodegradable ingredients, or consist essentially of biodegradable ingredients. In embodiments, the agricultural formulations comprise organically produced, or "organic" ingredients as defined in the United States Department of Agriculture (USDA) National Organic Program (NOP) ingredients list. In embodiments, the agricultural formulations comprise food grade ingredients as defined by the United States Food and Drug Administration (FDA) guidelines. In embodiments, the agricultural formulations comprise inert ingredients as defined in the United States Environmental Protection Agency (EPA) Inert Ingredients List in 40 CFR180 paragraphs 910-960. In embodiments, the agricultural formulations comprise FIFRA Minimal Risk ingredients as defined in 40 CFR152.25, under the United States Federal Insecticide Fungicide and Rodenticide Act (FIFRA). In embodiments, the agricultural formulations are nontoxic, naturally derived, and/or organic, and the formulations can be used to prevent damage to crops by insects, animals, fungi, bacteria, and environmental damage. In embodiments, the formulation ingredients are derived from food grade raw materials. In embodiments, the formulation ingredients comprise materials generally recognized as safe ("GRAS") by the U.S. Food and Drug Administration, as set forth in 21 CFR 170.3 and 21 CFR 170.30, under the Federal Food, Drug, and Cosmetic Act (FDCA), sections 201(s) and 409, or consist essentially of materials generally recognized as safe.

This concentrated liquid suspension has a number of commercial advantages, for example a highly concentrated product form that minimizes the volume of product to be shipped from the point of manufacture to the point of use. The storage capacity requirements are minimized by having a highly concentrated product form. It also offers advantages over the solid, granular or powdered formulations: ease of handling as liquid product, compatibility with automated pumping equipment, safer for handling with reduced worker exposure, and less dust formation. The minimal amount of water in the product can provide benefits in lowered viscosity, reduced tendency for mold and bacteria growth, and a lower freezing point or pour point of the product.

In certain embodiments, the concentrated liquid suspension can be diluted with water or with other solvents at or near the point of use to form a diluted liquid suspension, and the diluted liquid suspension can then be applied to an agricultural target by methods such as spraying, misting, fogging, electrostatic spraying, dipping, brushing, or broadcasting. The dilution can be accomplished by inline mixing or batch mixing to form the diluted suspension, and the diluted suspension can be handled and applied using conventional spraying equipment. The diluted suspension is formed as an oil-in-water emulsion or an oil-in-water suspension, where the oil phase comprises the drying oil.

When applied to an agricultural target, the agricultural formulation forms a curable coating comprising the oil or oil blend and the particulate material. In embodiments, the curing mechanism is based on the behavior of the drying oil(s), where crosslinks develop between double bonds of neighboring fatty acid or triglyceride chains via atmospheric oxygen insertion, forming a cured polymer network. The rate of curing can be increased by use of curing additives, i.e., additives such as oxidants or metal salts that accelerate the rate of curing of the drying oil(s).

In embodiments, the concentrated suspension is made by blending a surfactant, a drying oil, and particulates, where the surfactant represents about 0.1 to about 15% by mass of the suspension. In an embodiment, the suspension contains no water. In embodiments, the suspension contains less than about 20% water by mass. In embodiments, the concentrated suspension contains from about 40% to about 98% by mass of an oil phase. In embodiments, the concentrated suspension contains from about 50% to about 90% by mass of an oil phase. In embodiments, the concentrated suspension contains from about 60% to about 80% of an oil phase. In embodiments, the concentrated suspension contains from about 1% to about 50% by mass of suspended particulates. In embodiments, the concentrated suspension contains from about 10% to about 40% by mass of suspended particulates. In embodiments, the concentrated suspension contains from about 20% to about 35% by mass of suspended particulates.

In embodiments, the concentrated suspension is made by blending a surfactant, a blend of drying oils, and particulates where the particulates concentration ranges from about 0% to about 38% of the suspension by mass, and the surfactant concentration ranges from about 4% to about 10% of the suspension by mass, with the blend of drying oils forming the remainder of the suspension. In embodiments, the formulation is water-free; in other embodiments, water is present at amounts ranging from about 0% to about 5% by mass.

In embodiments, the agricultural formulations comprise or consist essentially of ingredients that are nontoxic, such that they have a low toxicity towards plants or animals. Low toxicity can be defined as having a $LD_{50}$ of >1000 mg/kg, or preferably a $LD_{50}$ of >5000 mg/kg. Toxicity has been classified by Hodge-Sterner classes, based on article "Tabulation of Toxicity Classes" by Harold Hodge and James Sterner, published in American Industrial Hygiene Association Quarterly Volume 10, Issue 4, 1949. In embodiments, the agricultural formulations can fit the description of Hodge-Sterner classes 1, 2, or 3; in preferred embodiment, the formulations can fit the description of Hodge-Sterner class 1. In embodiments, the agricultural formulations comprise naturally derived ingredients, such as plant oils, triglycerides, and naturally occurring minerals.

In embodiments, the agricultural formulations can be applied such that they dry into the form of a porous film, allowing for transpiration by the plant. In embodiments, the porous film can be formed by incorporating or forming micropores in the form of gas voids, or by incorporating porous minerals. In embodiments, the micropores can be formed by dissolution or degradation of a minor component of the coating, leaving behind a porous coating.

In embodiments, the agricultural formulations disclosed herein can be used as vehicles or adjuvants for conveying agricultural treatment agents in fluid form to agricultural targets. As used herein, the term "treat" means to beneficially affect the longevity, productivity, or other biological or economic aspect of an agricultural target, and an "agricultural treatment agent" refers to any chemical or biological active ingredient used to carry out such treatments. The term "secondary agricultural treatment" refers to an agricultural treatment that is applied in addition to, before, or subsequent to a treatment with the agricultural formulations disclosed herein. Non-limiting examples of agricultural treatment agents include pesticides, herbicides, fungicides, sulfur, copper oxide, plant growth regulators, plant hormones, pheromones, insecticidal soaps, insect pheromones, sunscreens, beneficial bacteria, beneficial fungi, *Trichoderma, Bacillus thuringiensis* (Bt), *Aspergillus*, nematodes, RNAi; Botanical extracts and essential oils such as neem, clove, d-limonene, citrus extract, pinene, pine extract, capsaicin, camphor, geraniol; probiotics, beneficial bacteria or beneficial fungi, extracts from bacterial cultures or fungal cultures, Spinosyn A, Spinosyn D, biopesticides, biofungicides, nematodes, biological control agents, and nutrients.

As used herein, the term "nutrient" or "nutrients" refers to those elements that are essential to plant growth. The term "nutrients" includes both macronutrients and micronutrients. Besides the essential elements for growth provided by air and water (carbon, hydrogen, oxygen), there are the three macronutrients (nitrogen, phosphorus, potassium) that plants require in large quantities, and a number of secondary nutrients and micronutrients (calcium, magnesium, sulfur, boron, chlorine, copper, iron, manganese, molybdenum, zinc, and the like) that are required in smaller, even trace, amounts. The micronutrients can perform especially critical functions in the plant lifecycle, such as enhancing sugar translocation, strengthening protein formation, increasing photosynthesis, improving root strength, enabling plant immunity, and the like.

Nutrient-containing foliar sprays can be used to provide essential nutrients to plants, for example to correct nutritional deficiencies that limit plant growth or increase susceptibility to pests and pathogens. However, simple sprays that are currently in use consist of one or more nutrients dissolved or dispersed in water; after application, these formulations are easily washed or brushed off the foliar surface. This susceptibility to wash-off or brush-off decreases nutrient availability, and it can add to the run-off of these chemicals into local water supplies. In embodiments, the formulations disclosed herein contain nutrients, and form a nutrient-containing film that retains one or more nutrients on the foliage. This property minimizes nutrient wash- or brush-off, extending the time available for absorption by the plant and extending the residual activity of the nutrient. Examples of suitable nutrients include nitrogen, phosphorus, potassium, boron, copper, iron, manganese, molybdenum, zinc, chlorine, nickel, calcium, magnesium, sulfur, and silicon. Nutrients may be supplied as salts, complexes, chelates, or organic-inorganic compounds. Nutrients may be dissolved in the formulation, dispersed in the formulation, or adsorbed to a component of the formulation. In embodiments, for example, nutrients may be adsorbed to the clay present in the formulation. Dispersed nutrients may take the form of particles with a mean particle size of less than 100μ, less than 10μ, or less than 1μ.

In embodiments, the nontoxic agricultural formulation can be combined with a pheromone that affects mating behavior or causes mating confusion in insects. For example, the pheromone-containing agricultural formulation can be used to deter successful insect reproduction or oviposition, or to cause insects to deposit eggs in areas where the resulting larvae will not survive.

Agricultural treatment agents can comprise agricultural chemicals that may be formulated as liquids, solutions, dispersions, pastes, gels, or aerosols. Agricultural treatment agents can non-lethally alter the behavior of a pest. For example, agricultural treatment agents can comprise biological control agents, which exert a beneficial effect on an agricultural target through their biological activity, for example by competing with agricultural pathogens for space or nutrient on the agricultural target, or by antagonizing the growth of agricultural pathogens, by inducing resistance in the agricultural target, by acting as a natural enemy to an agricultural pest, by causing mating confusion, by causing excessive grooming behavior, or by other biologically-mediated processes. As used herein, an agricultural target can include plant surfaces and seed surfaces (pre- or post-harvest), plant products, and soil or agricultural growth media surfaces.

As used herein, the term "agricultural chemical" refers to an active chemical ingredient used for agricultural purposes, such as an herbicide, pesticide, fungicide, fertilizer, insecticide, probiotic, nematicide, plant growth regulator, plant hormone, insect hormone, pheromone, pest repellent or nutrient. For example, the formulation can serve as a protective coating for plants, fruits, vegetables, foliage, berries, seeds, nuts, and the like, while also delivering an agricultural chemical. In embodiments, the agricultural chemicals can be herbicides such as dicamba, chloramben, nicosulfuron, and glyphosate; they can be insecticides such as imidacloprid, neonicotinoids, pyrethroids, chlorantraniliprole, or sulfoximines. In embodiments, the agricultural chemicals can be fungicides such as azoxystrobin, calcium polysulfide, Metalaxyl, chlorothalonil, fenarimol, copper salts, cuprous oxide, metal-dithiocarbamate complexes, ferbam, mancozeb, mefenoxam, myclobutanil, pyraclostrobin, prothioconazole, propiconazole, sulfur, thiophanate methyl, triadimefon, and trifloxystrobin. In embodiments, the agricultural chemical can be an oil-soluble chemical, a water-soluble chemical, or a dispersible solid material.

In embodiments, the agricultural treatment can be a physical agent such as a sunscreen or a moisture retainer. In embodiments, agents such as caffeine, benzoic acid, para-amino benzoic acid, avobenzone, zinc oxide, and titanium dioxide can be used as sunscreens. In embodiments, humectant agents such as urea, glycerol, polyvinyl alcohol, ethylcellulose, methylcellulose, hydroxyethylcellulose, calcium chloride, and polyethylene glycol (PEG) can be used as moisture retainers.

In embodiments, the agricultural treatment agent can comprise a biological agent such as gram-positive bacterium, a gram-negative bacterium, a motile microbe, a non-motile microbe, a root nodule microbe, a soil microbe, a rhizosphere microbe, a fungus, and the like.

In certain embodiments, the biological agent comprises one or more beneficial microbes. As used herein, the term "microbe" is interchangeable with "microorganism," referring to a microscopic single-celled or multicellular organism. Classes of microorganisms include, but are not limited to, organisms such as bacteria, fungi, algae, archaea, viruses, and protozoa. Use of microbes as agricultural treatment agents can offer agricultural benefits such as enhancing nitrogen fixation, suppression of disease, protection against plant pathogens, inducing disease-resistance in plants, improving nutrient uptake, stimulating growth and productivity, improving tolerance to environmental stress and the like. For example, in embodiments, microbes used for agricultural treatment can provide direct protection for a plant by infecting insect pests or plant-pathogenic microorganisms that may attack the plant. As an example of this use, *Beauveria bassiana*, a fungus naturally present in soils, may be used as an entomological pathogen against insect pests. Or, for example, in other embodiments, microbes used for agricultural treatment can provide indirect protection for a plant by competing with pathogenic species for nutrients, by restricting or eliminating nutrients required by pathogenic species or insect pests, or by producing antimicrobial compounds that adversely affect pathogenic species. In yet other embodiments, microbes used for agricultural treatment can increase the supply or bioavailability of nutrients to the plant. In other embodiments, microbes used for agricultural treatment can stimulate beneficial biological activity within the plant, for example, stimulating foliar growth, stimulating root growth, stimulating immune response, fostering tolerance of abiotic stress, and the like.

In embodiments, the agricultural treatment can comprise a biological agent such as beneficial bacteria or fungi, for example fungi in mycorrhizal relationship with the roots of plants, entomopathogenic strains of fungi, *Beauveria, Metarhizium, Isaria, Nomuraea, Tolypocladium, Lecanicillium, Entomophthora muscae, Beauveria bassiana, Pandora neoaphidis, Hirsutella thompsonii, Neozygites floridana, Paecilomyces fumosoroseus, Metarhizium anisopliae, Bacillus aspergillus, Bacillus thuringiensis* (Bt), and nematodes. In embodiments, the agricultural treatment agent can be a biopesticide as defined by the United States EPA (https://www.epa.gov/pesticides/biopesticides). In embodiments, the agricultural treatment agent can be produced by bacteria, such as spinosyn A and spinosyn D, which are produced by *Saccharopolyspora spinosa*.

In embodiments, the formulation can comprise a beneficial microbe that is a viable microbe. A viable microbe can be a propagatable microbe, i.e., one that is a living organism capable of replication. Alternatively, the beneficial microbe can be viable but non-propagatable, having beneficial properties not dependent upon their replication. For these viable microbes, whether or not capable of replication, certain of their beneficial attributes can arise from their capacity to release beneficial substances that contribute to the well-being (including absence of disease) in a plant, or certain of their beneficial attributes can arise from their capacity to induce a plant-beneficial effect when consumed by another organism having a relationship to such plant. For example, the viable beneficial microbe, whether or not propagatable, can have an adverse effect on a pest that might otherwise infest a plant, for example if the pest consumes the microbe; this adverse effect on the pest thus has a beneficial effect on the otherwise vulnerable plant.

In embodiments, the formulation can comprise a beneficial microbe that is a non-viable microbe. Such microbes, while living organisms at some point, are no longer alive in the formulation, and their beneficial properties are not dependent upon their viability. The non-viable microbes or substances derived from them can exert beneficial effects, for example by providing beneficial substances that contribute to the well-being (including absence of disease) in a plant, or by inducing a plant-beneficial effect when consumed by another organism having a relationship to such plant. For example, a microbe such as *B. thuringesis* can damage the gut of insects that consume it, even if the microbe itself is no longer alive.

Non-viable materials, e.g., compounds derived from viable or non-viable microbes, can be included in the term "biopesticide." Such biopesticides can include materials (e.g., compounds, secretions, excretions, etc.) derived from living microbes; biopesticides can also include materials derived from non-viable microbes (e.g., compounds, secretions, excretions, or derivatives from processing the microbes themselves).

In embodiments, the concentrated liquid suspension can comprise adjuvants such as cellulosic polymers, cellulose acetate, cellulose acetate butyrate, cellulose acetate propionate, starch, thermoplastic starch, polyethylene glycol, polylactic acid, polyglycolic acid, polylactic-glycolic acid, propylene glycol, block copolymers of ethylene oxide and propylene oxide, glycerin, osmotic suppressors such as calcium chloride, terpenes, and plant oils. In embodiments, the drying-oil based agricultural formulation can comprise a cellulose-based or cellulose-derived material such as cellulose esters, cellulose acetate, cellulose diacetate, cellulose triacetate, cellulose acetate propionate, cellulose acetate butyrate, cellulose fibers, cellulose microfibers, cellulose nanofibers, cellulose ethers, ethylcellulose, methylcellulose, carboxymethylcellulose, hydroxyethylcellulose, hydroxypropylcellulose, hydroxypropylmethylcellulose, and the like. In embodiments, the cellulose-based or cellulose-derived material can be a cellulose-based polymer that has a drying oil covalently attached to it, for example by esterification. In embodiments, a cellulose-derived material can contain a cellulose-based material as described above combined with one or more functional groups that impart advantageous properties. In other embodiments, the nontoxic barrier coating composition for agricultural surfaces can be formed from a biodegradable composition comprising a polyhydroxyalkanoate such as polyhydroxybutyrate.

B. Methods of Using the Formulations

The present disclosure also relates to methods of using nontoxic agricultural formulations in the form of a concentrated liquid suspension. The agricultural formulations can be applied to a variety of agricultural substrates or targets, such as plant surfaces (leaves, fruits, seeds, berries, nuts, grains, stems, roots, etc.), soils or agricultural growth media, and harvested plant products such as fruits, vegetables, seeds, grains, stems, roots, and the like.

In embodiments, the soil surface can be treated to produce a beneficial effect selected from the group consisting of erosion control, nutrient retention, agricultural treatment agent retention, dust control, delivery of beneficial microbes, or augmentation of beneficial microbial growth.

In embodiments, the nontoxic agricultural formulations can be used to form seed coatings to improve properties of the seeds, such as viability, productivity, growth rate, emergence timing, insect resistance, mold resistance, dust control, resistance to flaking off of active pesticide ingredients, and moisture resistance. When used as seed coatings, the formulations can provide protection against *Rhizoctonia* and *Fusarium* and soybean rust and nematodes, aphids, maggots, and worms. The formulations can offer reduced dusting of seed coatings for handling improvements, safety, environmental contamination, and avoiding nontarget applications. The seed coatings can improve dry flow and non-clumping of the treated seeds; this results in less residue and requires less cleaning of equipment. Seed coatings can include rooting compounds, hormones and plant growth regulators. In embodiments, the formulation can be diluted with water and applied to an agricultural target to form a cured coating.

In embodiments, the nontoxic agricultural formulations can be applied to tropical crops such as cocoa, coffee, papaya, mango, pineapple, avocado, melons, watermelons, and banana. In the example of cocoa, the nontoxic agricultural formulation can deter cocoa pod borers (*Conopomorpha cramerella*) from damaging the crop. In addition, for cocoa, the nontoxic agricultural formulation can deter black pod infestations, for example involving *Phytophthora* species organisms such as *P. palmivora, P. megakarya, P. capsici, P. citrophthora, P. megasperma, P. katsurae*, and the like. Also, for cocoa, the nontoxic agricultural formulation can deter frosty pod and witches' broom disease (WBD) infestations, involving organisms such as basidiomycete fungi, *Moniliophthora roreri, Moniliophthora perniciosa*, and the like. In coffee, the nontoxic agricultural formulation can deter insects such as the coffee berry borer, or plant diseases such as coffee rust. In embodiments, the nontoxic agricultural formulation can prevent or reduce the spread of fungal infestations by reducing the ability of spores to become airborne. In embodiments, the nontoxic agricultural formulation can prevent or reduce the spread of fungal infestations by reducing the ability of airborne spores to germinate on plant surfaces. In embodiments, the nontoxic agricultural formulation can prevent or reduce the spread of fungal infestations by encapsulating or otherwise immobilizing fungi on plant surfaces, preventing part or all of the microorganism from obtaining access to the plant interior.

In embodiments, the nontoxic agricultural formulations can be applied to vegetable crops such as squash, onion, celery, lettuce, spinach, pumpkin, tomato, eggplant, peppers, broccoli, cabbage, cucumber, and the like. In embodiments, the nontoxic agricultural formulations can be applied to root crops such as potato, beet, carrot, turnip, ginger, and sweet potato. In embodiments, the nontoxic agricultural formulations can be applied to legume crops such as beans, soybeans, and peanuts. In embodiments, the nontoxic agricultural formulations can be applied to cereal grains such as corn, oat, wheat, sorghum, alfalfa, barley, and rice. In embodiments, the nontoxic agricultural formulations can be used to deter pests such as the corn earworm, navel orangeworm, and pecan case borer. In embodiments, the nontoxic agricultural formulations can be applied to tree nut crops such as almond, cashew, macadamia, walnut, pecan, and pistachio. In embodiments, the nontoxic agricultural formulations can be applied to tree fruits such as apples, pears, peaches, plums, cherries, lemons, oranges, grapefruits, pomelos, and limes. In embodiments, the nontoxic agricultural formulations can be applied to berry crops such as strawberries, raspberries, blueberries, cranberries, blackberries, and elderberries. In embodiments, the nontoxic agricultural formulations can be applied to grapes for production of table grapes, juice, or wine. In embodiments, the nontoxic agricultural formulations can be applied to turf grasses, lawns, golf courses, and ornamental plants.

In embodiments, the nontoxic agricultural formulations can be used to improve the yield of a crop. The yield of a crop is determined by numerous factors, including plant health, nutrient and water availability, pest pressures, heat stress, environmental conditions, sunlight, and the microbiome around the plants. When applied to a crop, the nontoxic agricultural formulation can influence certain of these factors. In embodiments, the nontoxic agricultural formulations can reduce the water demand of a crop by reducing the loss of water vapor by transpiration to the atmosphere.

In embodiments, the nontoxic agricultural formulations can be used to protect plants and crops from diseases caused by microorganisms, including but not limited to microorganisms such as fungi, mold, mildew, bacteria, viruses, and the like, causing diseases such as potato virus X (PVX), potato virus Y (PVY), blight, zebra chip disease, bacterial infections, phytoplasmas, leafspot, brown rot, gall, downy mildew, corn smut, apple rust, leaf curl, leaf spot, mosaic virus, oomycetes, mistletoe, dwarf mistletoe, scab, canker, anthracnose, and the like. In embodiments, the nontoxic agricultural formulations can be used to protect plants and crops from insect-borne bacteria and viruses. As used herein, the term "infection" refers to a pathological infestation of a plant by a microorganism, or a disease caused thereby. It is understood that an infection can result from an invasion of a plant by an exogenous source of microorganisms, where the attachment to or colonization of the plant by the microorganism results in plant pathology or disease, either by surface-directed activities, by entry of the exogenous microorganism into the plant interior, or by other pathogenic behaviors of the microorganism (e.g., toxin formation). It is also understood that an infection can occur due to an endogenous source of microorganisms that behaves in a pathological manner, either by surface-directed activities, by entry of the endogenous microorganism into the plant interior, or by other pathogenic behaviors of the microorganism (e.g., toxin formation). As an example, an infection can result when the microorganism is initially present on the plant surface (whether the microorganism is originally an exogenous one or an endogenous one), and entry of part or all of this microorganism into the plant interior results in the plant pathology. In certain embodiments, in preventing or ameliorating or eradicating infections (collectively, "treating infections"), the nontoxic agricultural formulation can encapsulate or otherwise immobilize the potentially pathogenic microorganisms on the plant surface, thereby preventing part or all of the microorganisms from obtaining access to the plant interior. In other embodiments, in treating infections, the non-toxic agricultural formulation can prevent the incursion of potentially pathological exogenous microorganisms onto the plant. In yet other embodiments, in treating infections, the nontoxic agricultural formulation can counteract or prevent surface-directed activities or other behaviors of microorganisms, such as toxin formation.

In embodiments, the nontoxic agricultural formulations can be used to protect plants and crops from insect and animal damage caused by weevils, maggots, worms, slugs, flies, fruit flies, mites, ants, spiders, caterpillars, moths, grasshoppers, locusts, leafhoppers, leafrollers, leafminers, aphids, psyllids, ants, beetles, bugs, thrips, rabbits, deer, rodents, and the like. In embodiments, the nontoxic agricultural formulations can be used to protect plants and crops from environmental stresses like excessive sunlight, freezing or frost conditions, oxidative damage, microbial or fungal growth, osmotic swelling and cracking during wet conditions, and desiccation during low humidity or windy conditions.

After preparation, the agricultural formulations can be delivered to a point of distribution or a point of use. The formulations remain stable for a prolonged period of time, for example 3-6 months or longer. For application to agricultural targets, the concentrated liquid suspensions can be diluted with a diluent, for example water, and sprayed onto the plant surfaces. In embodiments, the diluted liquid suspension can contain from about 60 to about 99% water. In embodiments, in more detail, the agricultural formulations can be applied onto an agricultural target by spraying, brushing, misting, aerosol application, fogging, backpack spraying, dipping, or irrigation on agricultural targets. The spray solution can further be modified with small amounts of flow aids such as hydrophilic polymers to aid the dispersion of the droplets after spraying and to minimize drift of aerosol to nontarget areas, such as high molecular weight water soluble polyacrylamides. In certain embodiments, the formulations are resistant to friction or rubbing off, and/or they are water-resistant. In other embodiments, water-soluble polymers or waxes such as polyethylene glycols can be added to make the film easily removable after a few washes.

In certain embodiments, the formulation can be applied to an agricultural target, e.g., a plant, a fruit, a vegetable, and the like. For example, in embodiments a formulation can be sprayed onto surfaces of an agricultural target, e.g., fruit or vegetable or plant surfaces (trunks, foliage, leaves, branches, seeds, berries, nuts, roots, and the like) or the soil or other agricultural growth medium, where the formulation can contain active ingredients. Oil droplets containing the active ingredient can coat the agricultural target surface and form a crosslinked film upon drying. In embodiments, the nontoxic barrier coating can protect plants from pests such as weevils, maggots, worms, borers, slugs, flies, fruit flies, moths, grasshoppers, locusts, leafhoppers, leafrollers, aphids, ants, beetles, bugs, thrips, rabbits, deer, rodents, and the like. In embodiments, the nontoxic barrier coating can protect plants and crops from damages caused by diseases transmitted by insects. In embodiments, the nontoxic barrier coating can protect plants from diseases such as fungi, mold, mildew, citrus greening, huanglongbing (HLB) disease, leafspot, brown rot, gall, downy mildew, corn smut, apple rust, leaf curl, leaf spot, mosaic virus, scab, canker, and anthracnose.

In certain embodiments, the drying-oil-based agricultural formulation can be used to form a nontoxic barrier coating composition when applied to an agricultural target, e.g., a plant, a fruit, a vegetable, and the like. For example, in embodiments a formulation can be sprayed onto surfaces of an agricultural target, e.g., fruit or vegetable or plant surfaces (trunks, foliage, leaves, seeds, berries, nuts, roots, branches, and the like), where the formulation can be free of toxic ingredients such as pesticides. In embodiments, the nontoxic barrier coating compositions can deter pest damage due to an altered sensory recognition of the plant surface; for example, the treated plant surface can have a different surface energy, slipperiness, compatibility with insect foot physiological structures, surface texture, odor profile, visual appearance, and heat signature compared with an untreated plant surface. This altered sensory presentation can change the behaviors of insects and animals such that they do not elect to eat or otherwise damage the treated plant. In embodiments, the nontoxic barrier coating compositions can cause the pests to engage in grooming behaviors that can deter them from damaging the agricultural target. In embodiments, the nontoxic barrier coating can immobilize pests that contact the coating by adhering to them. The mechanical and rheological properties of the nontoxic barrier coating can be chosen such that once the coating adheres to the pest, the pest is unable to free itself from the coating, nor is it able to remove the coating from the agricultural target. Such pests may be present on the agricultural target prior to formation of the nontoxic barrier coating, or they may arrive at the agricultural target after the coating has been established. In embodiments, the nontoxic barrier coating can impede motion of the pest over the surface of the agricultural target leading to deleterious consequences for the pest, for example interfering with its ability to locate feeding or reproductive sites. In embodiments, the nontoxic barrier coating can interfere with the odor profile associated with the pest or the plant surface to the detriment of the pest, for example selectively absorbing compounds emitted by the pest or plant surface, or releasing compounds that interfere with, block, confuse, or otherwise alter the odor profile. In embodiments, the nontoxic barrier coating composition can serve as protection of the agricultural target from insects, fungi, animals, drought conditions, air pollution damage, heat stress, and solar damage. As used herein, the term "barrier coating" or "barrier coating composition" can be formed as a continuous or discontinuous film or can be otherwise applied at a desired thickness.

In embodiments, the nontoxic barrier coating formulation can be applied to an agricultural target at a dosing rate of about 1 to about 200 lbs. (undiluted basis) of formulation per acre of crop. In embodiments, the nontoxic barrier coating formulation can be applied to an agricultural target at a dosing rate of about 3 to about 100 lbs. of formulation per acre of crop. In embodiments, the nontoxic barrier coating formulation can be applied to an agricultural target at a dosing rate of about 10 to about 75 lbs. of formulation per acre of crop. In embodiments, a concentrated formulation of the nontoxic barrier coating formulation, for example an oil blend formulation as described herein, can be applied to an agricultural target at a dosing rate from 0.2 kg/ha to 100 kg/ha. (undiluted basis). In other embodiments, a concentrated formulation of the nontoxic barrier coating formulation can be applied to an agricultural target at a dosing rate from about 1-150 L/ha, or about 5-50 L/ha.

Any of these beneficial effects, as described above, are non-limiting examples of desired therapeutic effects. An agricultural treatment is intended to bring about a desired therapeutic effect, i.e., any effect that enhances the production of agricultural products pre-harvest, or that enhances the appearance, taste, durability or other advantageous properties of the agricultural product post-harvest. A material used for an agricultural treatment is an agricultural treatment agent. For example, a desired therapeutic effect can be a protective effect (e.g., protection against pests, fungi, sun damage, drought, ozone, acid rain, environmental toxins, etc.), or a nutrient effect (e.g., delivery of fertilizers, growth hormones, plant nutrients, etc.), or a pre-harvest enhancement effect (e.g., providing an agent that improves the natural properties of the product pre-harvest, including through genetic modification), or a post-harvest protective or enhancement effect (e.g., protecting the skins or surfaces of fruits, vegetables, or seeds post-harvest, or improving their appearance, taste, or commercial attractiveness). Certain fruits and vegetables are subject to crop losses or economic damage due to exposure to environmental stresses like excessive sunlight, freezing or frost conditions, oxidative damage, microbial or fungal growth, osmotic swelling and cracking during wet conditions, and desiccation during low humidity or windy conditions. Reduction of these crop losses and economic damage is another example of a desired therapeutic effect of the coating formulations. Other examples of desired therapeutic effects will be familiar to those having ordinary skill in the art. To achieve a desired therapeutic effect, the target can be treated with the formulation for an exposure time, which is the time deemed appropriate for achieving the desired therapeutic effect. Exposure time for various formulations and targets will be familiar to those of ordinary skill in the art. The exposure time can be preselected, or it can be determined following exposure based on the degree of achievement of the desired therapeutic effect, or based on other parameters that can be observed or determined by the skilled artisan.

In embodiments, the agricultural formulations and methods disclosed herein can prolong the therapeutic effects of an active agricultural ingredient, such as a biological agent or an agricultural chemical. For example, the disclosed formulations can act to protect the active agricultural ingredient from dispersion or deactivation after it contacts the agricultural target. The agricultural formulations disclosed herein can deliver the agricultural chemicals to the agricultural target and retain them there; moreover, the agricultural formulations can protect the agricultural chemicals from adverse conditions such as rainfall, friction, wind, water exposure, and secondary agricultural treatments (e.g., subsequent sprayings or subsequent applications or utilizations of agricultural treatments) that might dilute or remove the agricultural chemical.

In embodiments, the agricultural formulations and methods disclosed herein can be used for delivering biological agents such as beneficial bacteria, beneficial fungi, and/or biological control agents to agricultural targets, and/or retaining biological control agents on agricultural targets. Biological control agents can include a variety of life forms, including plants, insects, and microorganisms such as bacteria, fungi, and viruses. In embodiments, the agricultural formulations can contain biological control agents in amounts from about 0.001% to about 10%. In embodiments, the agricultural formulations can contain biological control agents in amounts from about 0.01% to about 1%. In embodiments, the agricultural formulations can contain biological control agents in amounts from about 0.05% to about 0.5%. In embodiments, the biological control agents comprise at least one strain of *Bacillus thuringiensis* (Bt), or an endotoxin produced by Bt. The use of Bt is understood to be safe and effective for control of insects, and the delivery of Bt by the agricultural formulations and methods disclosed herein can improve or prolong the effectiveness of insect control. Biological control can include the importation of a natural enemy of an agricultural pest, the conservation of a natural enemy of an agricultural pest, or the augmentation of a natural enemy of an agricultural pest. The formulations and methods disclosed herein can serve a role in biological control by delivering biological control agents to an agricultural target in a solid or a liquid formulation, or by providing a barrier coating or film that assists with other biological control endeavors. In embodiments, delivery of the biological control agent by the agricultural formulations and methods disclosed herein can improve or prolong the effectiveness of the biological control agent by improving its rain fastness. In embodiments, for example, a barrier coating as described above can include biological control agents in particulate form, so that the biological control agent is held in proximity to an agricultural surface, and/or it is released in a predetermined, time-release manner.

In embodiments, biological control agents may be formulated in liquid or solid form. For example, commercially available suspensions of spores, toxins, fungi, virus particles, and the like, can be sprayed onto crops like conventional insecticides to act as biological control agents. A non-exhaustive list of exemplary biological control agent formulations is set forth in Table 1:

TABLE 1

| Representative Microbial Insecticidal Agents | |
|---|---|
| Pathogen | Host Range |
| *Bacillus thuringiensis* var. Kurstaki | Lepidopteran larvae |
| *Bacillus thuringiensis* var. Aizawai | Lepidopteran larvae |
| *Bacillus thuringiensis* var. Israelensis | Dipteran larvae |
| *Bacillus thuringiensis* var. Tenebrionis | Coleopteran larvae |
| *Bacillus popillae* | Scarab beetle larvae |
| *Nosema locustae* | Grasshoppers and Crickets |
| *Beauveria bassiana* | Larvae of soil dwelling insects |
| *Hirsutella thompsoni* | Phytophagous mites |
| *Lagenidium giganteum* | Mosquito larvae |
| Nuclear polyhedrosis viruses | Lepidopteran larvae |
| Granulosis virus | Codling moth larvae |
| *Steinernema feltiae* | Soil- and wood-dwelling larvae |
| *Heterorhabditis heliothidis* | Soil-dwelling larvae |

(Table from: https://www.cals.ncsu.edu/course/ent425/text19/biocontrol.html (2003))

The formulations and methods described above for producing agricultural treatments comprising solid or liquid agricultural chemicals can also be applied to agricultural treatment agents comprising biological control agents that have been formulated as solids or liquids.

Examples

Materials

Boiled linseed oil, Cargill
National Standard Bentonite 325, Bentonite Performance Minerals LLC
Industrial Corn Starch, Casco
Ecosense 919, DOW
Raw linseed oil, Cargill
Glycidyl ether of castor oil, CVC Specialty, Moorestown, NJ
Pluronic L121, BASF, Florham Park, NJ
Isopar M, ExxonMobil Chemical
Gum rosin, Sigma Aldrich, St. Louis, MO
Arabica Coffee plants, Amazon.com
Decyl Glucoside, Dow Chemical Connection
Linseed oil, Sigma Aldrich, St. Louis, MO
Triethylenetetramine (TETA), Sigma Aldrich, St. Louis, MO
Span 85, Tokyo Chemical Industry (TCI)
SugaNate 160, Colonial Chemical Co.
Potassium laurate, Viva Corporation
Xanthan gum, Cargill Geraniol, Sigma Aldrich, St. Louis, MO
d-Limonene, Florida Chemical Co.
Magnesium stearate, Sigma Aldrich, St. Louis, MO
Microcrystalline cellulose, Sigma Aldrich, St. Louis, MO
Castor oil, Sigma Aldrich, St. Louis, MO
Bentonite, Sigma Aldrich, St. Louis, MO
Titanium dioxide, J. T. Baker, Phillipsburg, NJ
Precipitated calcium carbonate, Specialty Minerals Inc., New York, NY
Other materials described in Examples below

Example 1: Preparation of Linseed Oil/Rosin 1:1 Mixture

Rosin was added to linseed oil at a 1:1 weight ratio. The mixture was mixed and heated above 60° C. for 2 hours to solubilize rosin in linseed oil.

Example 2: Preparation of Linseed Oil/Castor Oil Glycidyl Ether/Triethylenetetramine Linseed oil, castor oil glycidyl ether (GE35-H) and triethylenetetramine (TETA) were mixed at a ratio of 1:1:0.05. The mixture was mixed with a vortexer (VWR Scientific Products, Mini Vortexer 945800) for approximately 10 seconds.

Example 3: Preparation of Linseed Oil/Castor Oil Glycidyl Ether/Magnesium Stearate/Triethylenetetramine Linseed oil, castor oil glycidyl ether (GE35-H), magnesium stearate, and triethylenetetramine (TETA) were mixed at a ratio of 1:1:0.75:0.05. The mixture was mixed with a vortexer (VWR Scientific Products, Mini Vortexer 945800) for approximately 10 seconds.

Example 4: Methods of Treating an Agricultural Product

The formulations of Example 5 (below) can be applied to cocoa pods in order to reduce damage to the fruit due to the infestation by the cocoa pod borer (*Conopomorpha cramerella*). The formulations can be applied in the various stages of the pod growth, preferably in the time frame when the fruit skin is green, preferably after 2-4 weeks after the pods start growing on the plant. The application can be performed using a standard spray applicator such as a backpack sprayer. This application method is particularly suitable for pre-harvest coating application on large fruits growing on trees such as cocoa, pineapple, apples, and papaya although other application methods like conventional mechanical sprayers employed in large fields for row crops can also be used. The formulation can reside on the cocoa pod skin for a few weeks at a time, protecting the fruit from cocoa pod borer. The coating is expected be flexible and allow for growth of the fruit and a subsequent second application may be necessary a few weeks prior to harvest. After harvest, the fruits with no edible skins (such as cocoa pods) can be processed without a post-harvest wash. Although other fruits and vegetables with edible skins such as papaya, mango, apples, cherries, tomatoes can require a simple post-harvest wash with a mild soap to remove the coating.

This applied coating is expected to produce a high yield of fruit with unblemished and intact skins with no impact of pest infestation. It is expected that the coated fruits and vegetables would be attractive to consumers and safe for consumption with just the washing steps commonly performed by the consumers of these fruits and vegetables.

Example 5: Formulations for Treatment of Agricultural Targets

Formulations were prepared by blending the ingredients as shown in Tables 2 and 3 below. Each of the formulations was a viscous but free-flowing liquid.

TABLE 2

| Test No. | Boiled linseed oil (%) | Kaolin (%) | Isopar M (%) | Pluronic L121 (%) | Linseed oil (%) | Total (%) | Viscosity (cP) |
|---|---|---|---|---|---|---|---|
| 5.1 | 50.1 | 24.8 | 25.1 | 0.0 | 0.0 | 100.0 | 1050 |
| 5.2 | 45.9 | 31.1 | 23.0 | 0.0 | 0.0 | 100.0 | 1530 |
| 5.3 | 39.2 | 41.2 | 19.6 | 0.0 | 0.0 | 100.0 | 1880 |
| 5.4 | 53.7 | 31.4 | 14.9 | 0.0 | 0.0 | 100.0 | >6600 |
| 5.5 | 52.2 | 30.5 | 14.5 | 2.8 | 0.0 | 100.0 | 2960 |
| 5.6 | 51.0 | 29.8 | 14.2 | 5.0 | 0.0 | 100.0 | 2600 |
| 5.7 | 50.0 | 29.2 | 13.9 | 7.0 | 0.0 | 100.0 | 2500 |
| 5.8 | 36.6 | 21.4 | 10.2 | 5.1 | 26.7 | 100.0 | 5000 |

TABLE 3

| Test No. | Boiled linseed oil (%) | Bentonite (%) | Isopar M (%) | Pluronic L121 (%) | Linseed oil (%) | Total (%) | Viscosity (cP) |
|---|---|---|---|---|---|---|---|
| 5.9 | 50.1 | 24.8 | 25.1 | 0.0 | 0.0 | 100.0 | 1070 |
| 5.10 | 45.9 | 31.1 | 23.0 | 0.0 | 0.0 | 100.0 | 2500 |
| 5.11 | 39.2 | 41.2 | 19.6 | 0.0 | 0.0 | 100.0 | 2530 |
| 5.12 | 53.7 | 31.4 | 14.9 | 0.0 | 0.0 | 100.0 | 3130 |
| 5.13 | 52.2 | 30.5 | 14.5 | 2.8 | 0.0 | 100.0 | 3970 |
| 5.14 | 51.0 | 29.8 | 14.2 | 5.0 | 0.0 | 100.0 | >6600 |
| 5.15 | 50.0 | 29.2 | 13.9 | 7.0 | 0.0 | 100.0 | 5130 |
| 5.16 | 36.6 | 21.4 | 10.2 | 5.1 | 26.7 | 100.0 | 920 |

Example 6: Formulations Containing Different Surfactants

Several aqueous surfactants solutions were prepared for incorporation into a formulation. Each solution was prepared at 2000 by adding 2 grams of surfactant to 8 grams of tap water. The list of surfactants tested and their hydrophilic-lipophilic balance (HLB) values are listed in Table 4 below:

TABLE 4

| Surfactant solution No. | Surfactant Name | Surfactant Type | Surfactant HLB |
|---|---|---|---|
| 6.1 | Tergitol 15-s-3 | Secondary alcohol ethoxylate | 8.0 |
| 6.2 | Tergitol 15-s-5 | Secondary alcohol ethoxylate | 10.5 |
| 6.3 | Tergitol 15-s-7 | Secondary alcohol ethoxylate | 12.1 |
| 6.4 | Tergitol 15-s-9 | Secondary alcohol ethoxylate | 13.3 |
| 6.5 | Span 20 | Sorbitan monolaurate | 8.6 |
| 6.6 | Span 80 | Sorbitan monooleate | 4.3 |
| 6.7 | Span 85 | Sorbitan trioleate | 1.8 |
| 6.8 | Tween 20 | Ethoxylated sorbitan laurate | 16.7 |
| 6.9 | Tween 60 | Ethoxylated sorbitan stearate | 14.9 |
| 6.10 | Tween 80 | Ethoxylated sorbitan oleate | 15.0 |
| 6.11 | Tween 85 | Ethoxylated sorbitan trioleate | 11.0 |
| 6.12 | Pluronic L121 | PEG/PPG/PEG block copolymer | 1-7 |

An aliquot of 3.60 grams was taken from each of the 20% surfactant solutions of Table 4 and added to separate vials that each contain 21.60 grams of raw linseed oil. The surfactant solutions were agitated vigorously just before transferring to the linseed oil containing vials. After mixing the surfactant solutions with the raw linseed oil 10.80 grams of bentonite was added to each vial and again agitated vigorously. The final component percentages of each sample vial were 6000 raw linseed oil, 300% bentonite, 80% water, and 20% surfactant; these samples are listed in Table 5.

The formulations were left undisturbed for 65 hours and then evaluated for stability by assessing how easily the settled bentonite could be re-dispersed. Each vial was gently inverted to see how much the bentonite had settled at the bottom of the vial and how redispersible the settled bentonite was. Inverted samples were rated with a bentonite packing number between 1 and 5 where 1 means "easy to redisperse" and 5 means "difficult to redisperse". Samples with bentonite that re-dispersed upon inversion by gravity alone were noted. Then each sample was shaken vigorously by hand for about 5 seconds each and again evaluated on whether or not the settled bentonite would re-disperse. The results are listed in Table 5 below.

TABLE 5

| Sample Blend No. | Surfactant | Surfactant HLB | Resuspendable Upon Inversion? | Resuspendable Upon Shaking? | Bentonite Packing (1 to 5) |
|---|---|---|---|---|---|
| 6.13 | Tergitol 15-s-3 | 8.0 | No | Yes | 5 |
| 6.14 | Tergitol 15-s-5 | 10.5 | Yes | Yes | 2 |
| 6.15 | Tergitol 15-s-7 | 12.1 | Yes | Yes | 2 |
| 6.16 | Tergitol 15-s-9 | 13.3 | No | Yes | 5 |
| 6.17 | Span 20 | 8.6 | No | Yes | 5 |
| 6.18 | Span 80 | 4.3 | Yes | Yes | 2 |
| 6.19 | Span 85 | 1.8 | Yes | Yes | 1 |
| 6.20 | Tween 20 | 16.7 | No | Yes | 5 |
| 6.21 | Tween 60 | 14.9 | No | Yes | 3 |
| 6.22 | Tween 80 | 15.0 | No | No | 5 |
| 6.23 | Tween 85 | 11.0 | No | No | 3 |
| 6.24 | Pluronic L121 | 1-7 | Yes | Yes | 1 |

Example 7: Formulations with Bentonite or Corn Starch Particle Types

The following formulations were prepared.
Formulation #7a: 30% National Standard 325 bentonite, 70% Raw Linseed Oil. Add 9 g of National Standard 325 bentonite to 21 g of Raw Linseed oil. Mix until homogenous.
Formulation #7b: 30% National Standard 325 bentonite, 10% Ecosense 919, 60% Raw Linseed Oil. Make a 9:1 Raw Linseed Oil: Ecosense 919 by combining 18 g of Raw Linseed Oil (RLO) with 3 g of Ecosense 919 (ES). Mix until homogenous. Add 9 g of National Standard 325 bentonite to 21 g of 9:1 Raw Linseed Oil: Ecosense 919 blend. Mix until homogenous.
Formulation #7c: 30% Industrial Corn Starch, 70% Raw Linseed Oil. Add 9 g of Industrial Corn Starch to 21 g of Raw Linseed oil. Mix until homogenous.
Formulation #7d: 30% Industrial Corn Starch, 10% Ecosense 919, 60% Raw Linseed Oil. Make a 9:1 Raw Linseed Oil: Ecosense 919 by combining 18 g of Raw Linseed Oil (RLO) with 3 g of Ecosense 919. Mix until homogenous Add 9 g of Industrial Corn Starch to 21 g of 9:1 Raw Linseed Oil: Ecosense 919 blend. Mix until homogenous.

The formulated 7a, 7b, 7c, and 7d samples were left undisturbed for 2 hours and then observed for oil split and any other settling observations. Next, the samples were inverted to determine the amount of effort required to resuspend the mixture. Water dispersibility tests were performed on formulations that were resuspendable. To conduct a water dispersibility test, 2 g of concentrate was mixed into 31.3 g of tap water and the samples were vortexed. The observations are documented in Table 6.

TABLE 6

| Formulation No. | Particle type | Fluid phase | Oil Split by volume | Ease of resuspending | Dispersible in water |
|---|---|---|---|---|---|
| 7a | Bentonite | RLO | 9% | Very good | No |
| 7b | Bentonite | RLO/ES | 0% | Good | Yes |
| 7c | Corn starch | RLO | 7% | Very good | No |
| 7d | Corn starch | RLO/ES | 2% | Good | Yes |

Example 8: Formulations with Different Surfactants

The following formulations were prepared:
Formulation #8a: 30% National Standard 325, 70% Raw Linseed Oil. Add 9 g of National Standard 325 to 21 g of Raw Linseed oil. Mix until homogenous.
Formulation #8b: 30% National Standard 325, 5% Pluronic L121, 65% Raw Linseed Oil. Make a 19:1 (Raw Linseed Oil: Pluronic L121) blend by combining 19.95 g of Raw Linseed Oil (RLO) with 1.05 g of Pluronic L121. The Pluronic L121 material is 100% actives with no water. Mix until homogenous. Add 9 g of National Standard 325 bentonite to 21 g of oil/surfactant. Mix until homogenous.
Formulation #8c: 30% National Standard 325, 10% Ecosense 919, 60% Raw Linseed Oil. Make a 9:1 Raw Linseed Oil: Ecosense 919 by combining 18.9 g of Raw Linseed Oil (RLO) with 2.1 g of Ecosense 919. Mix until homogenous Add 9 g of National Standard 325 to 21 g of oil/surfactant. Mix until homogenous. The Ecosense 919 surfactant is 50% actives and 50% water.

Formulation #8d: 30% National Standard 325, 10% Decyl Glucoside, 60% Raw Linseed Oil. Make a 9:1 blend of (Raw Linseed Oil: Decyl Glucoside) by combining 18.9 g of Raw Linseed Oil (RLO) with 2.1 g of Decyl Glucoside. Mix until homogenous Add 9 g of National Standard 325 bentonite to 21 g of oil/surfactant. Mix until homogenous. The Decyl Glucoside surfactant is 50% actives.

These formulations were tested according to the following protocol: Allow samples to remain undisturbed for 24 hours. Next measure oil split and any other settling observations. Afterwards invert and determine the amount of effort required to resuspend the mixture. Following these steps, water dispersibility tests were performed on formulations that were resuspendable; 2 g of concentrate were mixed into 31.3 g of tap water and samples were vortexed. Results of testing are documented in Table 7.

TABLE 7

| Sample No. | Surfactant | Oil Split | Ease of resuspending | Water dispersibility |
|---|---|---|---|---|
| 8a | None | 72% | Good | Poor |
| 8b | Ecosense 919 (10%) | 2% | Poor | Good |
| 8c | Decyl glucoside (10%) | 6% | Poor | Good |
| 8d | Pluronic L121 (5%) | 32% | Fair | Poor |

Example 9: Formulations with Suspension Additives

The following formulations were prepared:

Formulation #9a: 30% National Standard 325, 10% Pluronic L121, 60% Raw Linseed Oil. Combine 18 g of Raw Linseed Oil (RLO) with 3 g of Pluronic L121. Mix until homogenous. Add 9 g of National Standard 325 to 21 g of oil/surfactant. Mix until homogenous.

Formulation #9b: 30% National Standard 325, 10% Pluronic L121, 3% Magnesium Stearate, 57% Raw Linseed Oil. Combine 17.1 g of Raw Linseed Oil (RLO) with 3 g of Pluronic L121. Mix until homogenous. Next add 0.9 g of Magnesium Stearate. Add 9 g of National Standard 325 to 21 g of oil/surfactant. Mix until homogenous.

Formulation #9c: 30% National Standard 325, 10% Pluronic L121, 3% Microcrystalline Cellulose (MCC), 57% Raw Linseed Oil. Combine 17.1 g of Raw Linseed Oil (RLO) with 3 g of Pluronic L121. Mix until homogenous. Next add 0.9 g of MCC. Add 9 g of National Standard 325 bentonite to 21 g of oil/surfactant. Mix until homogenous.

These formulations were tested according to the following protocol: Samples were left undisturbed for 24 hours. Next measure oil split and any other settling observations. Afterwards invert and determine the amount of effort required to resuspend the mixture. At the conclusion of these tests, the following results were observed: The magnesium stearate containing sample (#9b) had increased viscosity compared with sample #9a and there was no oil split layer. The control sample 9a had an oil split layer. The MCC-containing sample (#9c) displayed less of an oil split and was easier to resuspend than the control sample 9a.

Example 10: Agricultural Formulation with Insecticidal Soap

A formulation suitable for agricultural application was prepared with the insecticidal soap potassium laurate. An 18.88 g aliquot of raw linseed oil was added to a 40 mL glass vial, followed by 1.60 g of SugaNate 160 and 1.60 g of a 40% Span 85 dispersion in water. These substances were shaken and vortexed together. Next, a 0.32 g sample of potassium laurate was added to the vial and again shaken and vortexed. A 0.32 g sample of xanthan gum was added, and the sample was shaken and vortexed once more. The last addition to the concentrated form was a 9.60 g sample of bentonite that was added in thirds, with shaking and vortexing taking place between each addition. After all of the bentonite was added, the vial was placed on a bottle roller for 30 minutes to disperse any remaining solid clumps. The finished product was a formulation suitable for agricultural application containing the insecticidal soap. To prepare a solution for application to plants, a 1.0 g aliquot of the formulation was taken and added to a 20 mL vial containing 15.65 g of tap water. The vial was shaken and vortexed and observed. After 1 to 2 minutes the vial showed a stable dispersion in water without any sign of solids settling or oil splitting for at least 30 minutes.

Example 11: Agricultural Formulation with Geraniol

A formulation suitable for agricultural application was prepared with geraniol, an essential oil that is an insect repellent. An 18.24 g aliquot of raw linseed oil was added to a 40 mL glass vial, followed by 1.60 g of SugaNate 160 and 1.60 g of a 40% Span 85 dispersion in water. These substances were shaken and vortexed together to ensure a well-mixed product. A 0.64 g sample of geraniol was added to the vial and again shaken and vortexed. A 0.32 g sample of xanthan gum followed and the sample once more shaken and vortexed. The last addition to the formulation was a 9.60 g sample of bentonite that was added in thirds, with shaking and vortexing taking place between each addition. After all of the bentonite was added the vial was placed on a bottle roller for 30 minutes to disperse any remaining solid clumps. The finished product was a formulation suitable for agricultural application containing an insect repellent essential oil. To prepare a dilution for application on plants, a 1.0 g aliquot of the formulation was taken and added to a 20 mL vial containing 15.65 g of tap water. The vial was shaken and vortexed and observed. After 30 minutes the emulsion was showing no signs of bentonite settling or oil separation.

Example 12: Agricultural Formulation with d-Limonene

A formulation suitable for agricultural application was prepared with d-Limonene, a botanical oil insecticide. An 18.24 g aliquot of raw linseed oil was added to a 40 mL glass vial, followed by 1.60 g of SugaNate 160 and 1.60 g of a 40% Span 85 dispersion in water. These substances were shaken and vortexed together to ensure a well-mixed product. A 0.64 g sample of d-Limonene was added to the vial and again shaken and vortexed. A 0.32 g sample of xanthan gum followed and the sample once more shaken and vortexed. The last addition to the concentrated form was a 9.60 g sample of bentonite that was added in thirds, with shaking and vortexing taking place between each addition. After all of the bentonite was added the vial was placed on a bottle roller for 30 minutes to disperse any remaining solid clumps. The finished product was a formulation suitable for agricultural application containing d-limonene. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of bentonite settling or oil separation.

Example 13: Agricultural Formulation with Capsaicin

A formulation suitable for agricultural application was prepared with the biopesticide capsaicin. An 18.24 g aliquot of raw linseed oil was added to a 40 mL glass vial, followed by 1.60 g of SugaNate 160 and 1.60 g of a 40% Span 85 dispersion in water. These substances were shaken and vortexed together to ensure a well-mixed product. A 0.64 g sample of Tabasco Chipotle Pepper Sauce with 1500-2500 heat units on the Scoville scale (McIlhenny Company) was added to the vial followed by more shaking and vortexing. The amount of capsaicin in the sauce was about 90-160 ppm based on conversion of the Scoville unit scale where 16 million Scoville units is equal to pure capsaicin. A 0.32 g sample of xanthan gum followed and the sample was once more shaken and vortexed. The last addition to the concentrated form was a 9.60 g sample of bentonite that was added in thirds, with shaking and vortexing taking place between each addition. After all of the bentonite was added the vial was placed on a bottle roller for 30 minutes to disperse any remaining solid clumps. The finished product was a formulation suitable for agricultural application containing capsaicin. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of bentonite settling or oil separation.

Example 14: Agricultural Formulation with Neem Oil

A formulation suitable for agricultural application was prepared with neem oil, a vegetable oil used as a pesticide for organic farming. A 15.68 g aliquot of raw linseed oil was added to a 40 mL glass vial, followed by 1.60 g of SugaNate 160 and 1.60 g of a 40% Span 85 dispersion in water. These substances were shaken and vortexed together to ensure a well-mixed product. A 3.20 g sample of neem oil (Blue Lily Organics) was added to the vial and again shaken and vortexed. A 0.32 g sample of xanthan gum followed and the sample was once more shaken and vortexed. The last addition to the concentrated form was a 9.60 g sample of bentonite that was added in thirds, with shaking and vortexing taking place between each addition. After all of the bentonite was added the vial was placed on a bottle roller for 30 minutes to disperse any remaining solid clumps. The finished product was a formulation suitable for agricultural application containing neem oil. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of bentonite settling or oil separation.

Example 15: Rainfastness of Agricultural Formulation Containing Neem Oil

The rainfastness of the agricultural formulation of Example 14 was tested as follows. A comparative neem oil formulation was prepared with 15.90 g of tap water added to a 20 mL vial, followed by 1.0 g of neem oil, 0.0175 g of potassium laurate, and 0.1134 g of 1.0M sodium hydroxide (Sigma Aldrich). This comparative mixture was vortexed and found to be stable enough to spray. 3 g of the comparative neem oil formulation was sprayed onto the surface of a tared 5"×3" acrylic sheet (Plaskolite brand) and then rolled with a paint roller. The acrylic sheet material was used as a model of the plant surface. On a separate tared 5"×3" acrylic sheet, a 3.0 g aliquot of the diluted agricultural formulation of Example 14 with neem oil was sprayed and rolled with a paint roller. Both treated acrylic sheets were allowed to dry for 18 hours so the coating could cure, their weights were recorded, and then the sheets were sprayed with water from a spray bottle for 15 seconds to simulate rainfall. After being sprayed with water, both sheets were put in a forced convection air oven at 37 C for 1.5 hours to dry, and their weights were recorded again. The sheet that was treated with the agricultural formulation of Example 14 containing neem oil retained 68% of the applied coating after simulated rainfall, while the sheet that was treated with the comparative formulation of neem oil, potassium laurate, and sodium hydroxide did not retain any of the coating after a simulated rainfall.

Example 16: Agricultural Formulation with Camphor Oil

A formulation suitable for agricultural application was prepared with white camphor oil, an essential oil used as a pest repellent. A 15.68 g aliquot of raw linseed oil was added to a 40 mL glass vial, followed by 1.60 g of SugaNate 160 and 1.60 g of a 40% Span 85 dispersion in water. These substances were shaken and vortexed together to ensure a well-mixed product. A 3.20 g sample of white camphor oil (Sigma Aldrich) was added to the vial and again shaken and vortexed. A 0.32 g sample of xanthan gum followed and the sample was once more shaken and vortexed. The last addition to the concentrated form was a 9.60 g sample of bentonite that was added in thirds, with shaking and vortexing taking place between each addition. After all of the bentonite was added the vial was placed on a bottle roller for 30 minutes to disperse any remaining solid clumps. The finished product was a formulation suitable for agricultural application containing white camphor oil. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of bentonite settling or oil separation.

Example 17: Agricultural Formulation with Beneficial Fungi

A formulation suitable for agricultural application was prepared with beneficial fungi. An 18.56 g aliquot of raw linseed oil was added to a 40 mL glass vial, followed by a 1.60 g aliquot of the product SugaNate 160 and a 1.60 g aliquot of a 40% Span 85 dispersion in water. These substances were shaken and vortexed together to ensure a well-mixed product. A 0.32 g sample of the product "White Shark" (Plant Revolution Inc.) was added to the vial and again shaken and vortexed. White Shark is a beneficial fungus powder containing 187,875 CFU/g of *Trichoderma koningii* and 125,250 CFU/g of *Trichoderma harzianum*. A 0.32 g sample of xanthan gum was then added, and the mixture was once more shaken and vortexed. A 9.60 g sample of bentonite was then added in thirds, with shaking and vortexing taking place between each addition. After all of the bentonite was added, the vial was placed on a bottle roller for 30 minutes to disperse any remaining solid clumps. The finished product was a formulation suitable for agricultural application containing beneficial fungi. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of bentonite or fungal spore powder settling or oil separation.

Example 18: Agricultural Formulation with Sulfur

A formulation suitable for agricultural application was prepared with elemental sulfur, which can be used as a fungicide. An 18.56 g aliquot of raw linseed oil was added to a 40 mL glass vial, followed by 1.60 g of SugaNate 160 and 1.60 g of a 40% Span 85 dispersion in water. These substances were shaken and vortexed together to ensure a well-mixed product. A 0.32 g sample of elemental sulfur powder was added to the vial and again shaken and vortexed. A 0.32 g sample of xanthan gum was then added, and the mixture was once more shaken and vortexed. A 9.60 g sample of bentonite was then added in thirds, with shaking and vortexing taking place between each addition. After all of the bentonite was added the vial was placed on a bottle roller for 30 minutes to disperse any remaining solid clumps. The finished product was a formulation suitable for agricultural application containing beneficial fungi. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of bentonite settling or oil separation.

Example 19: Rainfastness of Agricultural Formulation with Geraniol

The rainfastness of the agricultural formulation of Example 11 was tested as follows. A comparative geraniol formulation was prepared with 15.90 g of tap water added to a 20 mL vial, followed by 1.0 g of geraniol, 0.0175 g of potassium laurate, and 0.1134 g of 1.0M sodium hydroxide (Sigma Aldrich). This comparative mixture was vortexed and found to be stable enough to spray. 3 g of the comparative geraniol formulation was sprayed onto the surface of a tared 5"×3" acrylic sheet (Plaskolite brand) and then rolled with a paint roller. On a separate tared 5"×3" acrylic sheet, a 3.0 g aliquot of the diluted agricultural formulation of Example 11 with geraniol was sprayed and rolled with a paint roller. Both treated acrylic sheets were allowed to dry for 18 hours so the coating could cure, their weights were recorded, and then the sheets were sprayed with water from a spray bottle for 15 seconds to simulate rainfall. After being sprayed with water, both sheets were put in a forced convection air oven at 37° C. for 1.5 hours to dry, and their weights were recorded again. The sheet that was treated with the agricultural formulation of Example 11 containing geraniol retained 34.5% of the applied coating after simulated rainfall, while the sheet that was treated with the comparative formulation of geraniol, potassium laurate, and sodium hydroxide did not retain any of the coating after a simulated rainfall.

Example 20: Rainfastness of Agricultural Formulation with d-Limonene

The rainfastness of the agricultural formulation of Example 12 was tested as follows. A comparative d-limonene formulation was prepared with 15.90 g of tap water added to a 20 mL vial, followed by 1.0 g of d-limonene, 0.0175 g of potassium laurate, and 0.1134 g of 1.0M sodium hydroxide (Sigma Aldrich). This comparative mixture was vortexed and found to be stable enough to spray. 3 g of the comparative d-limonene formulation was sprayed onto the surface of a tared 5"×3" acrylic sheet (Plaskolite brand) and then rolled with a paint roller. On a separate tared 5"×3" acrylic sheet, a 3.0 g aliquot of the diluted agricultural formulation of Example 12 with d-limonene was sprayed and rolled with a paint roller. Both treated acrylic sheets were allowed to dry for 18 hours so the coating could cure, their weights were recorded, and then the sheets were sprayed with water from a spray bottle for 15 seconds to simulate rainfall. After being sprayed with water, both sheets were put in a forced convection air oven at 37° C. for 1.5 hours to dry, and their weights were recorded again. The sheet that was treated with the agricultural formulation of Example 12 containing d-limonene retained 53.9% of the applied coating after simulated rainfall, while the sheet that was treated with the comparative formulation of d-limonene, potassium laurate, and sodium hydroxide did not retain any of the coating after a simulated rainfall.

Example 21: Agricultural Formulation

A formulation suitable for agricultural application was prepared as follows. An 18.88 g aliquot of raw linseed oil was added to a 40 mL glass vial, followed by 1.60 g of SugaNate 160 and 1.60 g of a 40% Span 85 dispersion in water. These substances were shaken and vortexed together. A 0.32 g sample of xanthan gum was then added, and the mixture was once more shaken and vortexed. A 9.60 g sample of bentonite was then added in thirds, with shaking and vortexing taking place between each addition. After all of the bentonite was added the vial was placed on a bottle roller for 30 minutes to disperse any remaining solid clumps. The finished product was a formulation suitable for agricultural application in the form of a fluid suspension. To prepare a dilution for application on plants, a 1.0 g aliquot of the mixture was taken and added to a 20 mL vial containing 15.65 g of tap water. The 20 mL vial was shaken and vortexed and observed. After 30 minutes the emulsion was showing no signs of solids settling or oil splitting.

Example 22: Rain Fastness of Agricultural Formulation with *Trichoderma*

The rain fastness of the agricultural formulation of Example 17 was tested as follows. A comparative *Trichoderma* formulation (Example 22a) was prepared with 14.85 g of tap water added to a 20 mL vial, followed by 0.15 g of the product "White Shark" (Plant Revolution Inc.). This comparative mixture was vortexed and found to be stable enough to spray. 3 g of this comparative *Trichoderma* formulation was then sprayed onto the surface of a 5"×3" acrylic sheet (Plaskolite brand). On two separate 5"×3" acrylic sheets, 3 g of diluted agricultural formulation of Example 17 (samples a and b) with *Trichoderma* was sprayed onto each surface. All of the treated acrylic sheets were placed in a convection-free oven at 37 C for 1.5 hours to dry. Optical images of each sheet were taken using an optical microscope (Zeiss AxioImager.A1M). Each sheet was then exposed to simulated rainfall by spraying water from a spray bottle for 15 seconds. After being sprayed with water, the sheets were placed in a convection-free oven at 37 C for 1.5 hours to dry. Images of each sheet were again taken using an optical microscope. ImageJ software (National Institutes of Health) was used to analyze the particle distribution in each acrylic sheet, and these results are summarized in Table 8. The sheets that were treated with the diluted agricultural formulation of Example 17 containing *Trichoderma* retained 81-86% of the applied particles after simulated rainfall, while the sheet that was treated with comparative formulation of *Trichoderma* retained only 8% of the applied particles after simulated rainfall.

TABLE 8

| Sample Source | Before Simulated Rainfall: Avg. Particle Diameter [μm] | Before Simulated Rainfall: Particle Density [$mm^{-2}$] | After Simulated Rainfall: Avg. Particle Diameter [μm] | After Simulated Rainfall: Particle Density [$mm^{-2}$] | % removed % Removed by Rainfall |
|---|---|---|---|---|---|
| Example 22a | 3.2 | 1200 | 2.5 | 92 | 92 |
| Example 17 (sample a) | 4.1 | 6800 | 3.4 | 5500 | 19 |
| Example 17 (sample b) | 5.0 | 5900 | 3.5 | 5100 | 14 |

Example 23: Agricultural Formulations

Several surfactant products were evaluated by incorporating each one into an agricultural formulation sample. 8 formulation samples were prepared, using the ingredients listed in Table 9 below:

TABLE 9

| Sample | Surfactant/Source (% actives) | Raw Linseed Oil (gms) | Amount Surfactant (gms) |
|---|---|---|---|
| 23.1 | Lecisoy 400/Cargill (100%) | 19.84 | 0.64 |
| 23.2 | Topcithin UB/Cargill (100%) | 19.84 | 0.64 |
| 23.3 | Triton BG-10/DOW (70%) | 19.57 | 0.91 |
| 23.4 | Triton CG-110/DOW (50%) | 19.20 | 1.28 |
| 23.5 | Triton H-55/DOW (50%) | 19.20 | 1.28 |
| 23.6 | Witconate AOS/Akzo Nobel (40%) | 18.88 | 1.60 |
| 23.7 | Witconate NAS-8/Akzo Nobel (40%) | 18.88 | 1.60 |
| 23.8 | Tergitol 15-s-5/Sigma (100%) | 19.84 | 0.64 |

To prepare the samples, eight 40 mL vials were first filled with raw linseed oil (Cargill) in the amounts listed in Table 9. After the linseed oil was added, an aliquot of each surfactant product was added to the corresponding 40 mL vial as listed in Table 9, in an amount that was calculated so that 2% of the active surfactant ingredient would be present in the final sample formulation. A dispersion of 40% Span 85 (Millipore) was then vigorously shaken and then added in 1.60 gram amounts to each individual vial. Each sample vial was then shaken and vortexed together to ensure a well-mixed product. Following this, 0.32 grams of xanthan gum was added to each vial, and each vial was shaken and vortexed. The last addition to each vial was a 9.60 gram sample of bentonite that was added in thirds, with shaking and vortexing taking place in between each addition. After all of the bentonite had been added, each vial was placed on a roller for 30 minutes to disperse any remaining solid clumps. After 30 minutes, each vial was removed and a 1.0 gram aliquot of each mixture was taken and added to a 20 mL vial containing 15.65 grams of tap water, forming diluted samples. The diluted samples were shaken and vortexed vigorously and observed. The concentrated samples were left to sit overnight.

A control was then prepared in the same manner using the amounts of 18.72 grams raw linseed oil, 1.60 grams 40% Span 85 dispersion in water, 1.60 grams water, 0.48 grams xanthan gum, and 9.60 grams bentonite. After 30 minutes on the roller a 1.0 gram aliquot was taken and added to a 20 mL vial containing 15.65 grams of tap water, to form a diluted sample. The diluted sample was shaken and vortexed vigorously and observed. The concentrated sample was left to sit overnight.

The diluted samples were evaluated as to whether the bentonite remained dispersed or settled out, and as to whether the oil remained dispersed throughout the sample or became separated at the top. A good result was an even dispersion of clay and oil throughout the water. The results are listed in Table 10 below:

TABLE 10

| Sample | Surfactant | Bentonite dispersed or settled | Oil dispersed or separated |
|---|---|---|---|
| 23.1 | Lecisoy 400 | Settled | Dispersed |
| 23.2 | Topcithin UB | Settled | Dispersed |
| 23.3 | Triton BG-10 | Dispersed | Dispersed |
| 23.4 | Triton CG-110 | Dispersed | Dispersed |
| 23.5 | Triton H-55 | Settled | Dispersed |
| 23.6 | Witconate AOS | Dispersed | Dispersed |
| 23.7 | Witconate NAS-8 | Partially settled | Dispersed |
| 23.8 | Tergitol 15-S-5 | Settled | Dispersed |
| 23.9 | None (Control) | Settled | Separated |

The concentrated formulations were left untouched for 71 hours and then evaluated for stability by assessing how easily the settled bentonite was able to redisperse. Each vial was gently inverted to see how compacted the bentonite at the bottom had become and how redispersible the bentonite was. Inverted samples were graded with a "Dispersibility" number between 1 and 5 where 1 means "readily dispersible" and 5 means "not dispersible". Samples with bentonite that redispersed by simple inversion alone were noted. Then each sample was shaken vigorously by hand for about 5 seconds each and again evaluated on whether or not the settled bentonite would redisperse. The results are listed in Table 11 below:

TABLE 11

| Sample | Surfactant | Resuspendable Upon Inversion? | Resuspendable Upon Shaking? | Bentonite dispersibility (1 to 5) |
|---|---|---|---|---|
| 23.1 | Lecisoy 400 | No | Yes | 2 |
| 23.2 | Topcithin UB | No | Yes | 2 |
| 23.3 | Triton BG-10 | No | Yes | 2 |
| 23.4 | Triton CG-110 | No | Yes | 2 |
| 23.5 | Triton H-55 | No | Yes | 3 |
| 23.6 | Witconate AOS | No | No | 5 |

TABLE 11-continued

| Sample | Surfactant | Resuspendable Upon Inversion? | Resuspendable Upon Shaking? | Bentonite dispersibility (1 to 5) |
|---|---|---|---|---|
| 23.7 | Witconate NAS-8 | No | Yes | 4 |
| 23.9 | Tergitol 15-S-5 | Yes | Yes | 1 |
| 23.9 | None (Control) | No | Yes | 1 |

Example 24: Seed Coating with Agricultural Formulations

Burpee Pea Super Snappy seeds were coated with aqueous mixtures of 3%, 10%, and 16% (w/w) of the agricultural formulation of Example 21 in water; the coated seeds were then air dried at 22° C. The seeds (six replicates of each coating type) were planted in Conrad Fafard Organic Potting Mix and watered daily. Germination rates, as determined by % of the planted seeds that sprouted, were recorded after different amounts of time as shown in Table 12.

TABLE 12

Germination Rates

| Days after planting | Control (no coating) | 3% Coating | 10% Coating | 16% Coating |
|---|---|---|---|---|
| 3 | 0% | 67% | 67% | 33% |
| 4 | 17% | 83% | 67% | 50% |
| 5 | 50% | 100% | 67% | 50% |
| 6 | 50% | 100% | 67% | 50% |
| 7 | 50% | 100% | 67% | 67% |
| 10 | 50% | 100% | 67% | 67% |
| 11 | 50% | 100% | 67% | 67% |
| 12 | 50% | 100% | 67% | 67% |

Example 25: Agricultural Formulations with Stabilizers

Several different additives were evaluated for their ability to stabilize the formulation when it was diluted with water. To prepare these formulations, 14 separate vials were each filled with 18.88 grams of raw linseed oil (Cargill) followed by a 1.60 gram aliquot of the product SugaNate 160 (Colonial Chemical Company) and a 1.60 gram aliquot of a 40% Span 85 (Millipore) dispersion in water. These substances were shaken and vortexed together to ensure a well-mixed product. A single 0.32 gram sample of each emulsion stabilizer (as listed in Table 13) was measured out and added to each vial. After each vial received its respective emulsion stabilizer, the samples were again shaken and vortexed. Then, a 9.60 gram sample of bentonite was added in thirds, with shaking and vortexing taking place in between each addition. After all of the bentonite was added to a vial, it was placed on a roller for 30 minutes to disperse any remaining solid clumps. After 30 minutes, each vial was removed and a 1.0 gram aliquot of each mixture was taken and added respectively to a 20 mL vial containing 15.65 grams of tap water, to form a dilute sample. The dilute samples were shaken and vortexed vigorously and observed.

The dilute samples were evaluated as to whether the bentonite remained dispersed or settled out, and as to whether the oil remained dispersed throughout the sample or became separated at the top. A good result was an even dispersion of clay and oil throughout the water. The results are listed in Table 13 below:

TABLE 13

| Test # | Emulsion Stabilizer (Source) | Bentonite Behavior | Oil Behavior |
|---|---|---|---|
| 25.1 | Alginic acid (Sigma) | Settles quickly | Separates |
| 25.2 | Carrageenan (Sigma) | Settles quickly | Dispersed |
| 25.3 | CMC Na+ MW = 700,000 (Sigma) | Dispersed | Dispersed |
| 25.4 | Gelatin (Sigma) | Settles quickly | Separates |
| 25.5 | Pectin (CP Kelco) | Settles quickly | Separates |
| 25.6 | Pearl starch (Sigma) | Settles quickly | Separates |
| 25.7 | Gum Guar Carboxymethyl ether 2-hydroxypropyl ether, sodium salt (Sigma) | Settles slowly | Dispersed |
| 25.8 | Hydroxy propyl cellulose Mn = 10,000 (Sigma) | Settles, not fully dispersed | Dispersed |
| 25.9 | Hydroxy propyl cellulose Mn = 100,000 (Sigma) | Settles, not fully dispersed | Dispersed |
| 25.10 | Ethyl cellulose 4,000 cP (Sigma) | Some settling, partially dispersed | Separates |
| 25.11 | Ethyl cellulose 100,000 cP (Sigma) | Some settling, partially dispersed | Separates |
| 25.12 | Hydroxypropyl methyl cellulose (Sigma) | Settles slowly | Separates |
| 25.13 | CMC Na+ MW~250,000 (Sigma) | Settles | Separates |
| 25.14 | None (control) | Settles quickly | Separates |

Example 26: *Trichoderma* Spore Germination in Agricultural Formulations

The agricultural formulation of Example 17 was compared to a control formulation to assess the viability of the *Trichoderma* spores that each contained. The control *Trichoderma* formulation was prepared as follows: 0.15 gm of the *Trichoderma*-containing product "White Shark" was added to 14.85 g of tap water in a 20 mL vial. This control mixture was vortexed and found to be stable enough to spray. 1 g of this control *Trichoderma* formulation was then sprayed onto the surface of a 1"×3" glass slide. On a separate 1"×3" glass slide, 1 g of the diluted agricultural formulation of Example 17 was sprayed on the surface. Both treated glass slides were then placed in a convection-free oven at 37 C for 1.5 hours to dry. After this drying had taken place, a 0.2 g aliquot of a 0.02% aqueous potato dextrose agar ("PDA", Sigma Aldrich) solution was pipetted onto each previously coated glass slide. Each glass slide was then placed on top of separate 200 mL containers, each of which was then affixed with an adhesive inside separate 1 L containers. 60 g of tap water was placed inside each 1 L container to create a high humidity environment for the *Trichoderma* spores to proliferate, and to decrease evaporation rate of PDA media. Both prepared 1 L containers were sealed with a cap and incubated in a convection-free oven at 25 C for 3 days. After 3 days, the slides were removed from oven and inspected for *Trichoderma* spore germination via colony formation using a Zeiss AxioImager.A1M microscope. Both the control *Trichoderma* formulation and the formulation of Example 17 showed signs of *Trichoderma* germination as evidenced by the appearance of branched hyphae.

Example 27: *Trichoderma* Spore Germination in Agricultural Formulations after Simulated Rainfall The experiment of Example 26 was reproduced in order to test the control and the experimental sample for the presence of viable spores following exposure to simulated rainfall. A control *Trichoderma* formulation was prepared as described in Example 26. A test formulation was prepared as described in Example 17. Each formulation was applied to a glass slide and dried as described in Example 26. After this drying had taken place, each glass slide was then exposed to simulated rainfall by spraying water from a spray bottle for 15 seconds. After spraying with water, both slides were placed in a convection-free oven at 37 C for 1.5 hours to dry.

After drying, each slide received a 0.2 g aliquot of a 0.02% aqueous potato dextrose agar solution and was incubated as described in Example 26. After 3 days, samples were inspected for spore germination as described in Example 26. The glass slide that was treated with agricultural formulation of Example 17 containing *Trichoderma* showed germination (as evidenced by the appearance of branched hyphae) even after simulated rainfall, while the glass slide that was treated with the comparative formulation of *Trichoderma* did not exhibit any germination of *Trichoderma* after simulated rainfall.

Example 28-32: Additional Materials

The following materials were used for Examples 28-32, in addition to the materials described earlier:
Raw linseed oil (RLO), (CAS #67746-08-1) (Cargill)
Bentonite (Sodium bentonite clay) (CAS #1302-78-9) (BPM/Halliburton)
Jarfactant 325N, an alkylpolyglycoside surfactant with an alkyl chain length of 9-11 carbon units (CAS #132778-08-6) (Jarchem)
Span 85 (sorbitan trioleate) (CAS #26266-58-0)
Pluronic® F108 (PEG-PPG-PEG triblock copolymer and surfactant) (CAS #9003-11-6) (Sigma-Millipore)
Water (tap water from Cambridge MA) (all water is tap unless specified)
Ammonium hydroxide: a 30% solution of ammonia and water (CAS #1336-21-6)
Dowanol™ TPM (Tripropylene Glycol Methyl Ether) (Dow Chemicals)
THIXCIN® R (non-hygroscopic castor oil derivative) (Elementis Specialties)
Break Thru SP133 (additive based on based on polyglycerol esters and fatty acid esters) (Evonik)
HPMC—hydroxypropylmethyl cellulose (Methocel E15 LV, CAS #9004-54-3) (Dow Chemical Company)

Example 28: Formulation Preparation

An agricultural formulation was prepared as a concentrate, in large and small batch sizes (small≤250 g), using the reagents in amounts set forth below in Table 14:

TABLE 14

| Component | wt % | Small batch wt (g) | Large batch wt (g) |
|---|---|---|---|
| RLO | 54.7 | 43.76 | 2461.50 |
| Jarfactant 325N | 2.0 | 1.60 | 90.00 |
| Span 85 | 2.0 | 1.60 | 90.00 |
| Water | 2.27 | 1.81 | 102.00 |
| Bentonite | 38.2 | 30.56 | 1719.00 |
| Pluronic F108 | 0.5 | 0.40 | 22.50 |
| Ammonium hydroxide | 0.333 | 0.27 | 15.00 |
| TOTAL | 100 | 80.00 | 4500.00 |

To prepare the above formulations, a polymer solution was first prepared. An appropriate amount of Pluronic® F108 was weighed, in accordance with the amount designated in Table 14. An appropriate amount of water was added to a mixing vessel (e.g., a beaker for a large solution or a centrifuge tube for a small solution) so that an 18.2% solution of the Pluronic® F108 could be made. The Pluronic® F108 was then added gradually and mixed into the water, with care being taken that the Pluronic® F108 was mobilized thoroughly into the water and did not adhere to the vessel walls. When a centrifuge tube mixing vessel was used, it was then capped and placed on a laboratory roller at about 70% full speed. When a beaker-sized mixing vessel was used, it was mixed with a laboratory mixer using the fan blade mixing shaft of appropriate size for the mixing vessel. The Pluronic® F108 was mixed into the water until there was no solid polymer left, only water and foam. When clumps started to form, additional agitation and separation with a spatula was used to ensure complete dissolution. After it was verified that there was no longer any solid polymer (usually after several hours of mixing), the mixing vessel was removed from the mixing apparatus and was allowed to sit undisturbed for a period of time, allowing the foam above the solution to relax back into full liquid form; this resting phase required several hours, sometimes overnight.

After preparing the Pluronic® F108 solution, an appropriate amount of bentonite was weighed into a designated solids container. The solids container was then shaken to break up any clumps of solids. Appropriate amounts of RLO, Pluronic® F108 solution, and Jarfactant 325N were then combined, and an appropriate amount of the NaOH solution was added. These liquids were mixed briefly using an overhead mixer with a fan shaft blade until homogeneous. After the RLO and aqueous reagents were combined, an appropriate amount of Span 85 was added to the stirring sample. All liquid reagents were mixed thoroughly before that mixture was combined with the solids. The solid material was added gradually and mixed thoroughly during the addition process.

Example 29: Sedimentation Stability

Sedimentation stability was tested for the formulation prepared according to Example 28. To do so, a transparent plastic cylinder 1" in diameter was filled with a 12" column of freshly prepared formulation. Sedimentation of the aqueous phase in the concentrate resulted in the appearance of a layer of clear fluid at the top of the column, and the creation of a dense concentrate at the bottom of the column. The thickness of the clear fluid layer was determined by eye. The thickness of the dense concentrate was determined either by pouring the fluid from the tube and noting the height of the column of non-pourable material that remained behind, or by lowering a weight into the column and noting the depth at which the weight ceased to penetrate the fluid. Sedimentation measurements were made periodically until the sum of the clear and dense layers reached approximately 100%; see Table 15 below.

TABLE 15

Clear and dense layer thicknesses
(as percentage of original formulation height) over time

| Time [days] | % clear | % dense |
|---|---|---|
| 0.0 | 0% | 0% |
| 3.7 | 4% | |
| 4.7 | 5% | |
| 5.7 | 7% | |
| 6.7 | 9% | 34% |
| 9.8 | 12% | |

TABLE 15-continued

Clear and dense layer thicknesses
(as percentage of original formulation height) over time

| Time [days] | % clear | % dense |
|---|---|---|
| 10.7 | 13% | |
| 13.0 | 14% | |
| 13.9 | 13% | 75% |
| 16.7 | 15% | |
| 20.1 | 15% | |
| 20.8 | 16% | 86% |

Example 30: Stabilizing the Formulation Against Sedimentation with Dowanol™ TPM

The agricultural formulation prepared according to Example 28 was used for the following experiment. 200 g of the agricultural formulation was added to a beaker. Then, 8 g (4 wt %) of Dowanol TPM (Dow) was added while stirring at 300 rpm. Mixing was continued for 10 minutes. The resulting mixture was a pourable fluid with pseudoplastic properties. A Brookfield YR-1 Rheometer was used to measure the yield stress at 0.1 rpm. The resulting Yield Stress was 12.7 Pa. The formulation was then tested for sedimentation stability according to Example 29. After 7 days, a clear layer with a thickness equal to 3% of the original column height was observed.

Example 31: Stabilizing the Formulation with THIXCIN® R (Elementis Specialties)

The agricultural formulation prepared according to Example 28 was used for the following experiment. 200 g of the agricultural formulation was added to each of three beakers. Then, sufficient THIXCIN® R (Elementis Specialties) was added to each beaker to achieve THIXCIN® R concentrations of 0.05 wt %, 0.1 wt %, or 0.3 wt % while stirring at 300 rpm. Mixing was continued for 10 minutes while heating at 60° C. Upon cooling to room temperature, the resulting mixtures were pourable fluids with pseudoplastic properties. All formulations were tested for sedimentation stability according to Example 29. After 7 days, no sedimentation was observed in any of the formulations tested.

Example 32: Formulation Preparation

An agricultural formulation was prepared as a concentrate, in small batch sizes (small≤250 g), using the reagents in amounts set forth below in Table 16:

TABLE 16

| Component | wt % | wt (g) |
|---|---|---|
| RLO | 54.05 | 43.24 |
| Jarfactant 325N | 2.0 | 1.60 |
| Span 85 | 2.0 | 1.60 |
| Water | 2.5 | 2.00 |
| Bentonite | 38.2 | 30.56 |
| HPMC | 0.25 | 0.20 |
| Break Thru SP 133 | 1.00 | 0.80 |
| TOTAL | 100 | 80.00 |

To prepare the above formulations, first proper amounts of HPMC and Bentonite respectively were weighed into a sealable container; this container was then sealed and shaken to promote homogeneity. Appropriate amounts of water and Jarfactant 325N were then combined in a beaker and agitated to promote the dissolution of Jarfactant 325N. After agitation, the RLO was added, and an appropriate amount of Break-Thru SP 133 and Span 85 were added to the sample, as well. All liquid reagents were then mixed thoroughly on the laboratory overhead mixer with small fan blade attachment before that mixture was combined with the solids. The solid material was added gradually with a spatula while the mixture was stirring; once all solids had been added, a timer for 10 min was started, and the walls of the beaker (also stirring shaft) were scraped with a spatula to prevent any chunks of clay from remaining unmixed.

Example 33-36: Additional Materials

The following materials were used for Examples 33-36, in addition to the materials described earlier
Methocel E15-LV (hydroxypropylmethylcellulose) (CAS 9004-65-3) (Dow)
Soybean oil (CAS 8001-22-7) (Sigma-Aldrich)

Example 33: Formulation Preparation

An agricultural formulation was prepared as a concentrate, in small batch sizes (small≤250 g), using the reagents in amounts set forth below in Table 17:

TABLE 17

| Component | wt % |
|---|---|
| Two or more oils (oil blends) | 52.05 |
| Jarfactant 325N | 2.0 |
| Span 85 | 2.0 |
| Water | 2.5 |
| Methocel E-15 LV | 0.25 |
| Bentonite | 38.2 |
| Thixcin R + RLO | 2.00 |
| Break Thru SP 133 | 1.00 |
| TOTAL | 100 |

A formulation using the ingredients in Table 17 was prepared using batch mixing with an overhead mixer. First, the solids (bentonite and methocel) were mixed in an enclosed container by hand shaking for 10-20 seconds. In a separate container, the oil phase of the formulation was prepared by mixing a combination of desired oils using overhead mixer at a very low speed to prevent splashing (200-300 rpm). Subsequently, the aqueous reagents (Jarfactant 325N and distilled water) and the non-aqueous reagents (Span 85 and Break Thru SP 133) were incorporated into the oil phase and mixed until homogeneity is reached. Under continuous mixing, the solids were added into the oil mixture last. During the incorporation of the solids, the mixing speed was slowly increased to a speed to create sufficient vortex (700-800 rpm) and maintained at that speed for 15 minutes to fully wet the solids and form an even mixture. Then the formula was further mixed under high shear using homogenizers, or highspeed dispersers (5000-6000 rpm) for 25 minutes to fully develop the formula body. After mixing, viscosity of the formulations was measured to determine differences between compositions, and as a measure of pourability.

Example 34: Methods Used to Evaluate Properties of Coatings

The following observations and tests were used to evaluate the properties of various coatings that were formed in accordance with the Examples that follow.

(a) Natural drying observations: The natural drying process of the coating can be determined under natural or artificial lighting. Artificial lighting was preferred since it provides control, and continuous exposure. This affords the ability to accelerate development and testing. To correlate the intensity of the artificial and natural lighting, radiance in the UVB region was measured. The unsaturated bonds within the oils were most sensitive to light in this region.

(b) Rolling ball tack test: The rolling ball tack test was used to measure changes in coatings upon light exposure. The method was adapted from an industry standard measurement for pressure-sensitive adhesives. In this method, a stainless-steel ball rolled at a defined initial velocity across a coated surface. Adhesive interactions between the ball and the surface caused the ball to lose kinetic energy to the coating and eventually stop. The total distance traveled by the ball was used as a measure of the strength of these interactions. In general, two coating states were observed for a coated surface as a function of time. In the first state, the coating evolved from a predominantly viscous to a viscoelastic state. Chemically this was associated with the initial phase of autooxidation when oils are exposed to oxygen and light, a process that can be monitored using infrared spectroscopy to track the conversion of alkenes or unsaturated bonds. It is understood that significant intermolecular crosslinking events follow the initial state of autooxidation. This resulted in an increase in adhesive strength of the coating, which reduced the distance traveled by the rolling ball. In the second state, as crosslinking continued, the coating evolved from a viscoelastic to a predominantly elastic state. This reduced the adhesive strength, increasing the distance traveled by the rolling ball. Eventually, the coating became non-tacky and completely dry to the touch, and the distance traveled by the rolling ball reached a maximum value set by the size of the coating specimen. The time to reach this maximum value was referred to as the "drying time" for the coating. The initial reduction in rolling ball distance has been shown to coincide with an increase in alkene conversation rate as shown in FIG. 1.

(c) Test for film stiffness: The flexibility or stiffness of a self-supporting film was determined by a force-deflection measurement. The results obtained were analyzed to estimate a Young's modulus (or modulus of elasticity) for the film. To perform the measurements, films of known thickness were attached onto a stage across a circular orifice one inch in diameter using double-sided adhesive. A cylindrical probe one half inch in diameter was mounted on a translation stage, connected to a force sensor, and positioned above the center of the film. Using the translation stage, the probe was brought into contact with the center of the film, and the force required to deform the film was recorded as a function of the distance traveled by the probe.

Figure 2:
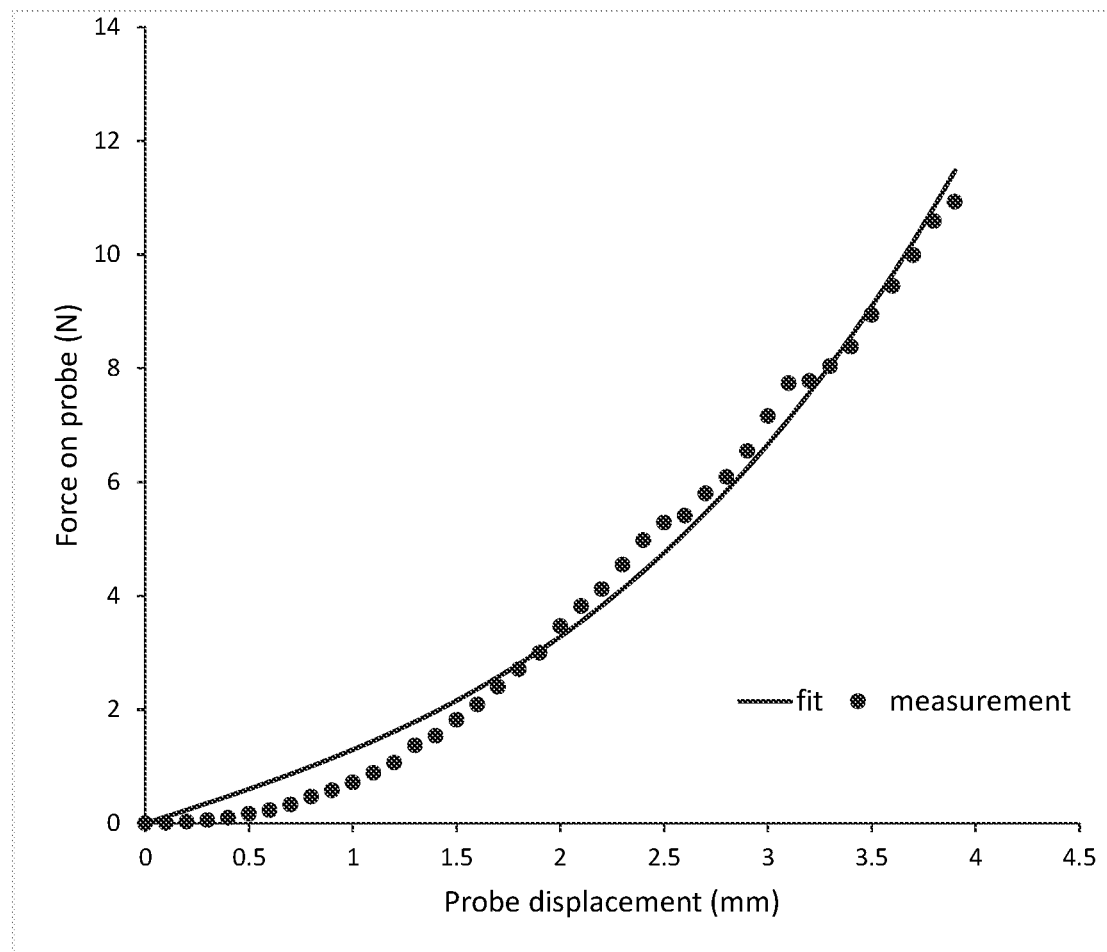
FIG. 2 is a graph showing force on a probe required to displace a film vs probe displacement, as measured for a cured linseed oil film.

The force required to create a given deflection in a pure linseed oil film (SB0) 130 µm in thickness is shown in FIG. 2. The stiffness data shown in FIG. 2 was fit to a model for a thin circular plate, fixed at the edge and subjected to a uniform pressure over a circular area at the center of the plate, in order to estimate the Young's modulus and residual stress of the film (Young, W. C. Roark's Formulas for Stress and Strain, 6th ed. 1989. McGraw-Hill Inc, New York, p 477-478). For a film of thickness t, radius R, Young's modulus E, residual stress $\sigma_R$, and Poisson's ratio of 0.3, which is subjected to a force F over a central area of radius a, the displacement d at the center of the film was assumed to satisfy the following equation:

$$F = \pi a^2 \left(\frac{Et^4}{R^4}\right)\left(9.17\frac{d}{t} + 5.50\frac{d^3}{t^3}\right) + \pi R^2 \sigma_R \frac{d}{t} \quad \text{EQ. 1}$$

Fitting the measurements shown in FIG. 2 to Equation 1 yields estimates for the Young's modulus and residual stress of the film of 26 MPa and 950 Pa, respectively.

Example 35: Formulations with Blends of Soybean Oil and Linseed Oil

Soybean oil and linseed oil were mixed at different ratios and then tested to determine the properties of different blends. The following formulations, as shown in Table 18, were tested:

TABLE 18

| Ingredient | Weight % |
|---|---|
| SB0 Soybean oil:Linseed oil 0:100 | |
| Soybean oil | 0.00 |
| Linseed oil | 52.05 |
| Jarfactant 325N | 2.00 |
| Span 85 | 2.00 |
| Water | 2.50 |
| Methocel E-15 LV | 0.25 |
| Bentonite | 38.20 |
| Break Thru SP133 | 1.00 |
| Thixcin + RLO | 2.00 |
| Total | 100.00 |
| SB10 Soybean oil:Linseed oil 10:90 | |
| Soybean oil | 5.21 |
| Linseed oil | 46.85 |
| Jarfactant 325N | 2.00 |
| Span 85 | 2.00 |
| Water | 2.50 |
| Methocel E-15 LV | 0.25 |
| Bentonite | 38.20 |
| Break Thru SP133 | 1.00 |
| Thixcin + RLO | 2.00 |
| Total | 100.00 |
| SB50 Soybean oil:Linseed oil 50:50 | |
| Soybean oil | 26.03 |
| Linseed oil | 26.03 |
| Jarfactant 325N | 2.00 |
| Span 85 | 2.00 |
| Water | 2.50 |
| Methocel E-15 LV | 0.25 |
| Bentonite | 38.20 |
| Break Thru SP133 | 1.00 |
| Thixcin + RLO | 2.00 |
| Total | 100.00 |
| SB75 Soybean oil:Linseed oil 75:25 | |
| Linseed oil | 13.01 |
| Soybean oil | 39.04 |
| Jarfactant 325N | 2.00 |
| Span 85 | 2.00 |
| Water | 2.50 |
| Methocel E-15 LV | 0.25 |
| Bentonite | 38.20 |
| Break Thru SP133 | 1.00 |
| Thixcin + RLO | 2.00 |
| Total | 100.00 |

Figure 3:
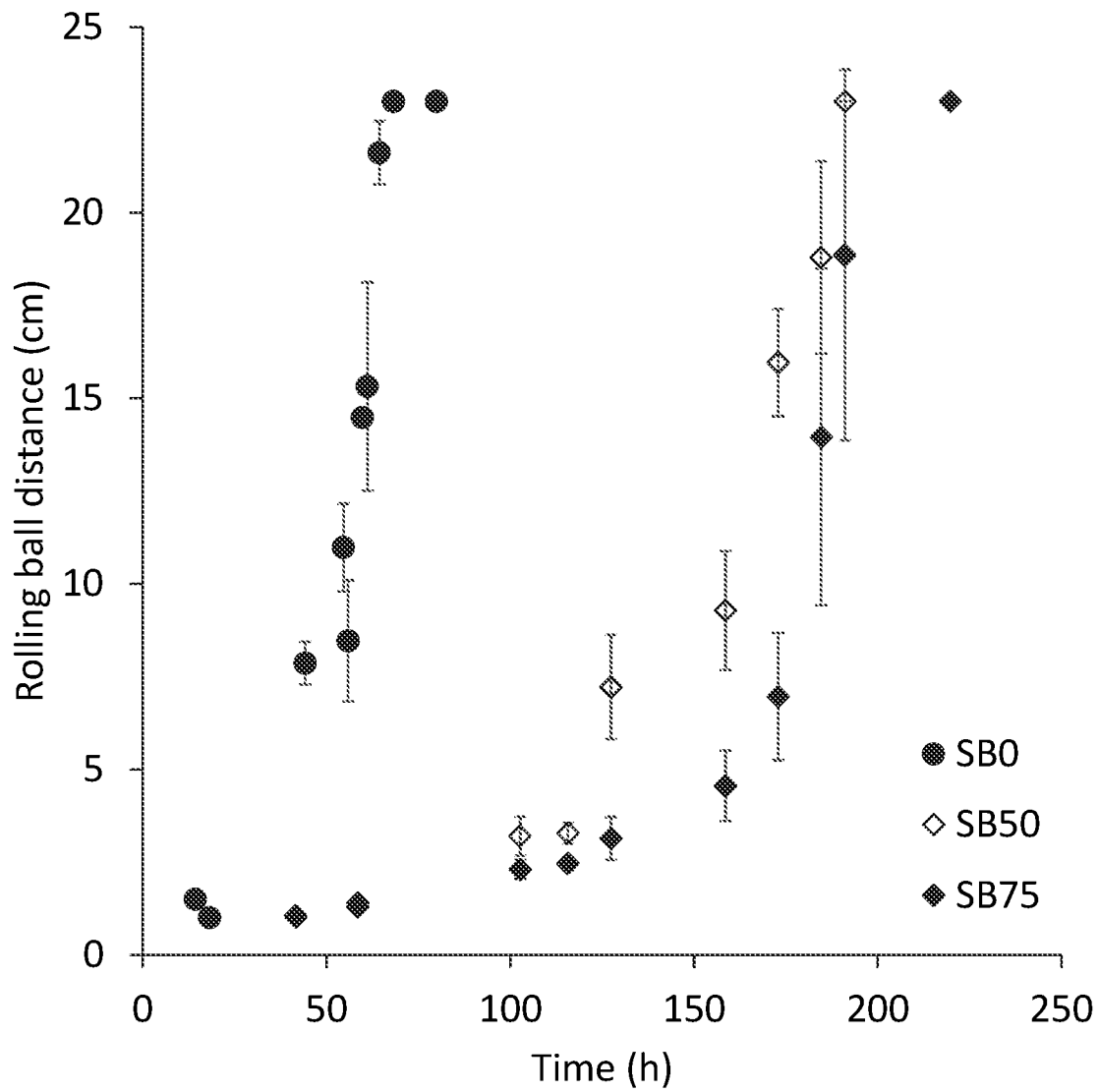
FIG. 3 is a graph showing distance traveled in the rolling ball test as a function of curing time in blends of linseed and soybean oils.
Figure 4:
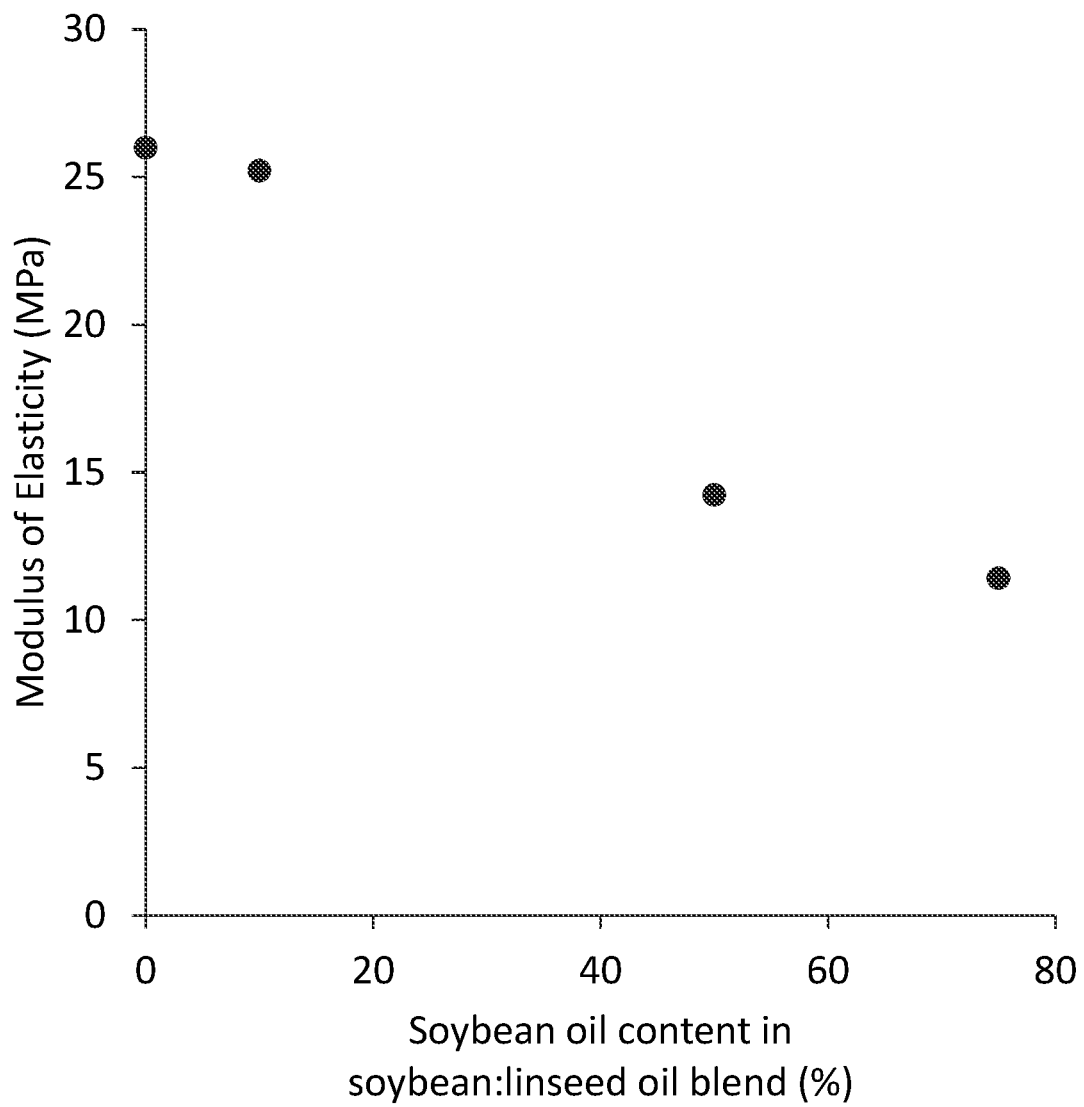
FIG. 4 is a graph showing modulus of elasticity for a film, as a function of % soybean oil in blends of linseed and soybean oil.

In this Example, soybean oil and linseed oil were mixed at different ratios and then tested to determine the effects of the oil blend on the formulation's physical properties. The rolling ball test determined that drying time increased with increasing concentration of soybean oil in the blend (i.e., SB0 through SB75), as shown in FIG. 3. As seen in FIG. 4, the modulus of elasticity decreased with increasing soybean oil content. Blending different oils may therefore be used to adjust the final modulus of the dried film.

Example 36: Formulation with Blend of Canola Oil and Linseed Oil

In this Example, a formulation was prepared as shown in Table 19, with canola oil and linseed oil mixed at a 50:50 ratio. The formulation was then tested to determine the effects of the oil blend on the formulation's physical properties.

TABLE 19

| Ingredient | Weight % |
|---|---|
| Canola oil | 26.03 |
| Linseed oil | 26.03 |
| Jarfactant 325N | 2.00 |
| Span 85 | 2.00 |
| Water | 2.50 |
| Methocel E-15 LV | 0.25 |
| Bentonite | 38.20 |
| Break Thru SP133 | 1.00 |
| Thixcin + RLO | 2.00 |
| Total | 100.00 |

Figure 5:
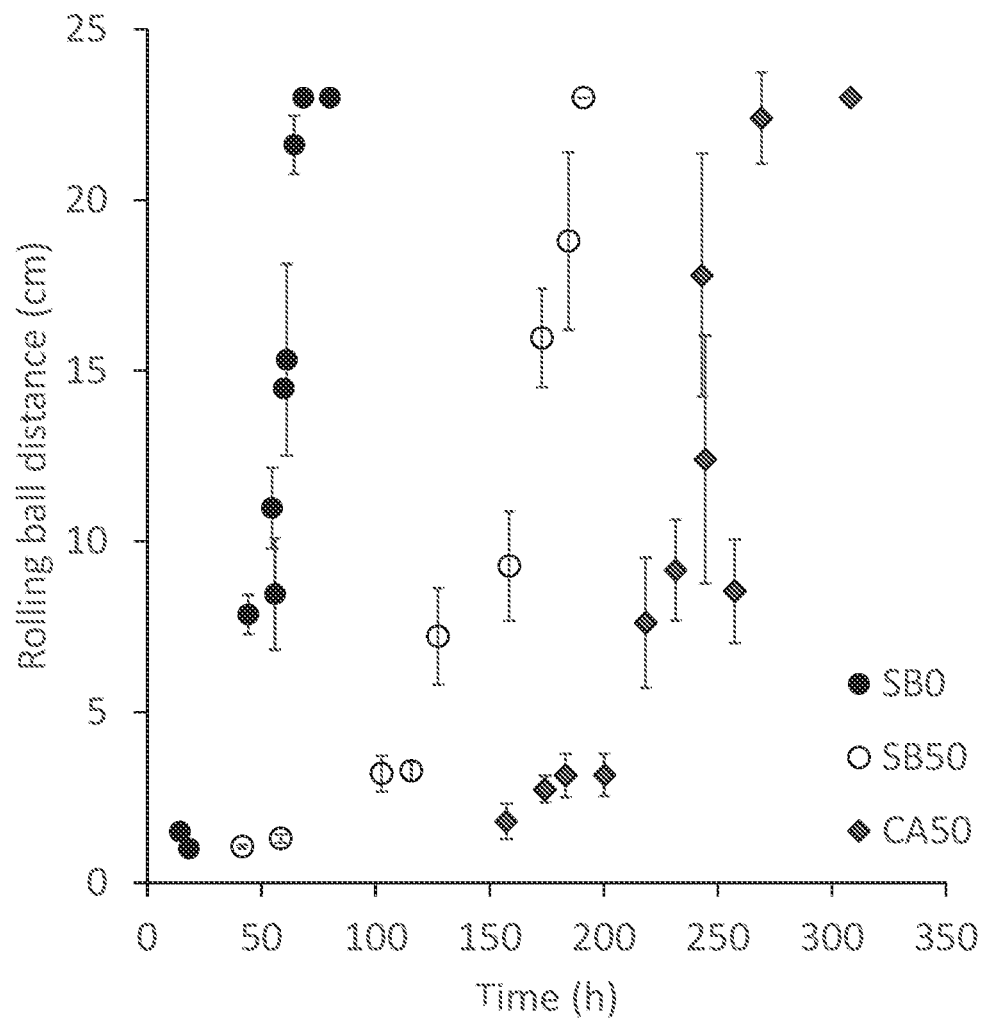
FIG. 5 is a graph showing distance traveled in the rolling ball test as a function of curing time in blends of linseed oil and different vegetable oils.

Drying time measurements performed using the rolling ball tack test indicated that the inclusion of canola oil (CA50), which contains a relatively low concentration of polyunsaturated acylglycerols, led to a significant increase in the drying time of the blend compared to pure linseed oil (SB0) and a mixture of linseed and soybean oil (SB50); see FIG. 5.

Example 37: Formulation Preparation

The following materials can be used for Example 37, in addition to the materials described for previous Examples:

Polyethylene glycol dodecyl ether (Brij L4 (CAS 9002-92-0) (Croda))

Low molecular weight nonionic silicone polyether surfactant (Sylgard OFX-0309 (CAS 125997-17-3, 75-85%) (Dow))

An agricultural formulation can be prepared as a concentrate, using the reagents in amounts set forth below in Table 20:

TABLE 20

| Component | wt % |
|---|---|
| Two or more oils (oil blends) - See Table 21 for exemplary blends | 70.0 |
| Brij L4 | 9.0 |
| Sylgard | 1.0 |
| Bentonite | 20.0 |
| TOTAL | 100 |

TABLE 21

| Oil Blend Components | % of each |
|---|---|
| Soybean:linseed | 50:50 |
| Soybean:linseed | 75:25 |
| Canola:linseed | 50:50 |

A formulation using the ingredients in Table 20 can be prepared using batch mixing with an overhead mixer. First, the solids (bentonite) are weighed. In a separate container, the oil phase of the formulation can be prepared by mixing a combination of oils using overhead mixer at a low speed to prevent splashing (200-300 rpm). Subsequently, the reagents (Brij L4 and Sylgard OFX-0309) can be incorporated into the oil phase and mixed until homogeneity is reached. Under continuous mixing, the solids can be added into the oil mixture last. During the incorporation of the solids, the mixing speed can be slowly increased to a speed to create sufficient vortex (400-500 rpm) and maintained at that speed for 10 minutes to fully wet the solids and form an even mixture. Then the formula can be further mixed under high shear using highspeed dispersers (1800-2500 rpm) for 10 minutes to fully develop the formula body. After mixing, viscosity of the formulations can be measured to determine differences between compositions, and as a measure of pourability. It is expected that the properties of the exemplary formulations will be similar to those described above in Examples 35 and 36.

EQUIVALENTS

While specific embodiments of the subject invention have been disclosed herein, the above specification is illustrative and not restrictive. While this invention has been particularly shown and described with references to preferred embodiments thereof, it will be understood by those skilled in the art that various changes in form and details may be made therein without departing from the scope of the invention encompassed by the appended claims. Many variations of the invention will become apparent to those of skilled art upon review of this specification. Unless otherwise indicated, all numbers expressing reaction conditions, quantities of ingredients, and so forth, as used in this specification and the claims are to be understood as being modified in all instances by the term "about." Accordingly, unless indicated to the contrary, the numerical parameters set forth herein are approximations that can vary depending upon the desired properties sought to be obtained by the present invention.

The invention claimed is:

1. A method of protecting an agricultural target from a pest, comprising:
diluting a concentrated liquid suspension with a solvent to form an agricultural formulation; and
applying the agricultural formulation onto the agricultural target,
wherein the concentrated liquid suspension comprises a surfactant, an organic phase and suspended particulate materials,
wherein the organic phase comprises a first oil and a second oil mixed together to form a blend, wherein the first oil is a drying oil selected from linseed oil and safflower oil, and the second oil is a drying oil selected from the group consisting of corn oil, soybean oil and canola oil;

wherein the organic phase is about 40 to about 90% by weight of the concentrated suspension;
wherein the suspended particulates are bentonite clay minerals and present at about 0.5 to about 50% by weight of the concentrated suspension;
wherein the surfactant is in an amount between about 4 and about 10% by weight of the concentrated suspension;

and wherein the applied agricultural formulation forms a tacky coating on the surface of the agricultural target that impedes motion of the pest on the surface or immobilizes the pest, thereby protecting the agricultural target from the pest.

2. The method of claim 1, wherein the first oil is linseed oil.

3. The formulation of claim 1, wherein the first oil is safflower oil.

4. The method of claim 1, wherein the second oil is selected from the group consisting of soybean oil, and canola oil.

5. The method of claim 4, wherein the second oil is soybean oil or canola oil, and the ratio of soybean oil or canola oil to linseed oil is between 10:90 and 75:25.

6. The method of claim 1, wherein the first oil and the second oil have different degrees of unsaturation.

7. The method of claim 1, wherein the blend comprises at least one additional oil.

8. The method of claim 1, wherein the surfactant is selected from the group consisting of anionic, cationic, nonionic, biodegradable, food grade and organic surfactants.

9. The formulation of claim 1, wherein the particulates are present in a range of about 0.5 to about 38% of the suspension by mass, the surfactant is present in a range of about 4 to 10% of the suspension by mass, and the blend forms the remainder of the suspension.

10. The method of claim 1, wherein the concentrated liquid suspension contains only non-aqueous liquids.

11. The method of claim 1, wherein the concentrated liquid suspension has one or more physical properties that are different than the physical properties of the first oil and the second oil.

12. The method of claim 11, wherein the one or more physical properties are selected from the group consisting of glass transition temperature of the cured film, solubility of small molecules in the cured film, permeability of the cured film to small molecules, film stiffness, film tack, film drying time, and durability.

13. The method of claim 1, wherein the formulation has improved pest control properties when compared to pest control properties of a control formulation that has an organic phase that comprises a single drying oil.

14. The method of claim 13, wherein the pest control properties are selected from the group consisting of diminished pest survival time, diminished pest fecundity, pest feeding deterrence, pest reproductive deterrence, and reduced plant damage.

15. The method of claim 1, wherein the agricultural target is soil.

16. The method of claim 1, wherein the agricultural target is a plant.

17. The method of claim 16, wherein the surface of the agricultural target is selected from the group consisting of leaves, fruits, seeds, berries, nuts, grains, stems, and roots of the plant.

18. The method of claim 1, wherein the agricultural formulation is applied to the agricultural target at a dosing rate of about 1 to about 200 lbs of formulation per acre of crop.

19. The method of claim 1, wherein the pest is an insect or animal.

20. The method of claim 19, wherein the insect or animal is selected from the group consisting of weevils, maggots, worms, slugs, flies, mites, spiders, caterpillars, moths, grasshoppers, locusts, leafhoppers, leafminers, aphids, psyllids, ants, beetles, and thirps.

21. The method of claim 20, wherein the flies are fruit flies.

22. The method of claim 1, wherein the surfactant is selected from the group consisting of an ethoxylated alcohol, a sorbitan fatty ester, an alkylpolyglycoside, an ethylene oxide/propylene oxide (EO/PO) copolymer, guar, xanthan, soy lecithin, an ethoxylated sorbitan stearate, and a nonionic silicone polymeric surfactant.

* * * * *